(12) United States Patent
Wei et al.

(10) Patent No.: US 10,715,542 B1
(45) Date of Patent: Jul. 14, 2020

(54) MOBILE APPLICATION RISK ANALYSIS

(71) Applicant: FireEye, Inc., Milpitas, CA (US)

(72) Inventors: Wen Wei, Saratoga, CA (US); Yulong Zhang, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 281 days.

(21) Appl. No.: 15/199,900

(22) Filed: Jun. 30, 2016

Related U.S. Application Data

(60) Provisional application No. 62/205,612, filed on Aug. 14, 2015.

(51) Int. Cl.
| | |
|---|---|
| *H04L 29/06* | (2006.01) |
| *G06F 3/0482* | (2013.01) |
| *G06F 16/951* | (2019.01) |
| *G06F 3/0483* | (2013.01) |

(52) U.S. Cl.
CPC ........ *H04L 63/1433* (2013.01); *G06F 3/0482* (2013.01); *G06F 16/951* (2019.01); *H04L 63/1425* (2013.01); *G06F 3/0483* (2013.01)

(58) Field of Classification Search
CPC ............. H04L 63/1433; H04L 63/1425; G06F 3/0482; G06F 3/0483; G06F 17/30864
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Towards Understanding Malware Behaviour by the Extraction of API Calls, Alazab, M.; Venkataraman, S.; Watters, P. Cybercrime and Trustworthy Computing Workshop (CTC), 2010 Second Year: 2010 pp. 52-59, DOI: 10.1109/CTC.2010.8.

(Continued)

*Primary Examiner* — Paul E Callahan
(74) *Attorney, Agent, or Firm* — Rutan & Tucker, LLP

(57) ABSTRACT

An electronic device comprising one or more processors; a storage medium communicatively coupled to the one or more processors, the storage medium having stored thereon logic that, upon execution by the one or more processors, performs operations comprising: (1) receiving, via a first electrical signal, application data from a mobile agent installed on a mobile device, (2) querying, via a second electrical signal, a database for a risk level of each of one or more applications of the mobile device listed in the application data, and (3) determining a threat level for the mobile device based on one or more of: (i) the risk level of at least one of the one or more applications, (ii) usage information of the at least one of the one or more applications, or (iii) configuration information of the mobile device is shown.

51 Claims, 20 Drawing Sheets

(56) References Cited

U.S. PATENT DOCUMENTS

| | | |
|---|---|---|
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B2 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |

(56) References Cited

U.S. PATENT DOCUMENTS

| | | |
|---|---|---|
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,826,240 B1 | 9/2014 | Lachwani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,409,090 B1 | 8/2016 | McKenzie et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,495,537 B2 * | 11/2016 | Gupta .................. G06F 21/50 |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,779,253 B2 * | 10/2017 | Mahaffey .............. G06F 21/577 |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |

(56) References Cited

U.S. PATENT DOCUMENTS

| | | |
|---|---|---|
| 9,946,568 B1 | 4/2018 | Ismael |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |

(56) References Cited

U.S. PATENT DOCUMENTS

| | | |
|---|---|---|
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0285578 A1 | 12/2007 | Hirayama et al. |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |

(56) References Cited

U.S. PATENT DOCUMENTS

| | | |
|---|---|---|
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0080634 A1 | 3/2013 | Grelewicz et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0012647 A1 | 1/2015 | Grelewicz |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0249106 A1 | 8/2016 | Lachwani et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0077158 A1* | 3/2018 | Jevans ................. G06F 21/577 |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

High-performance server systems and the next generation of online games, D'Amora, B.; Nanda, A.; Magerlein, K; Binstock, A.; Yee, B., IBM Systems Journal Year: 2006, vol. 45, Issue: 1 pp. 103-118, DOI: 10.1147/sj.451.0103.

Use of Role Based Access Control for Security-Purpose Hypervisors, Hirano, M.; Chadwick, D.W.; Yamaguchi, S. Trust, Security and Privacy in Computing and Communications (TrustCom), 2013 12th IEEE International Conference on Year: 2013 pp. 1613-1619, DOI: 10.1109/TrustCom.2013.199.

U.S. Appl. No. 14/949,770, filed Nov. 23, 2015 Notice of Allowance dated Mar. 1, 2018.

U.S. Appl. No. 14/949,770, filed Nov. 23, 2015 Non-Final Office Action dated Oct. 17, 2016.

U.S. Appl. No. 14/949,770, filed Nov. 23, 2015 Final Office Action dated Jul. 19, 2017.

U.S. Appl. No. 14/949,770, filed, Nov. 23, 2015 Advisory Action dated Oct. 5, 2017.

U.S. Appl. No. 13/775,174, filed Feb. 23, 2013 Notice of Allowance dated Aug. 11, 2015.

U.S. Appl. No. 13/775,174, filed Feb. 23, 2013 Non-Final Office Action dated Feb. 20, 2015.

Venezia, Paul , "NetDetector Captures Intrusions", InfoWorld Issue 27, ("Venezia"), (Jul. 14, 2003).

Vladimir Getov: "Security as a Service in Smart Clouds—Opportunities and Concerns", Computer Software And Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

(56) References Cited

OTHER PUBLICATIONS

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/.about.chris/research/doc/esec07.sub.—mining.pdf-.
"Network Security: NetDetector—Network Intrusion Forensic System (NIFS) Whitepaper", ("NetDetector Whitepaper"), (2003).
"When Virtual is Better Than Real", IEEExplore Digital Library, available at, http://ieeexplore.ieee.org/xpl/articleDetails.sp?reload=true&amumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.

(56) References Cited

OTHER PUBLICATIONS

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).

* cited by examiner

FIG. 7

| | NAME (LAST, FIRST) 711 | 712 EMAIL | 713 DEPARTMENT | 714 ROLE | 715 STATUS | 716 #DEVICES |
|---|---|---|---|---|---|---|
| ☐ | Demo, MSM | msm@email.com | Market | Security Admin | unregistered | 0 |
| ☐ | Mobile, Demo | john@email.com | Sales | Security Admin | unregistered | 0 |
| ☐ | DEMO_LNAME_DEMO_FNAME | jane@email.com | <DEFAULT> | Super Admin | unregistered | 0 |
| ☐ | Demo, MTP | msm@email.com | Sales | User | registered | 1 |
| ☐ | Demo, MTP | msm@email.com | Demo | User | registered | 2 |
| ☐ | DEMO_LNAME_DEMO_FNAME | msm@email.com | Engineering | Security Admin | registered | 1 |
| ☐ | Test, Demo | msm@email.com | Test | Security Admin | unregistered | 0 |

Search: demo  •  1 - 200 of 200

710

User Details  ✎  ✕

Demo, MSM
User

| First Name | MSM |
| Last Name | Demo |
| Email | msm@email.com |
| Role | Security Admin |
| Status | unregistered |
| #Devices | 0 |
| Source | Local User |

720

Mobile Threat Prevention
Dashboard  Devices  Users  Apps  Policies  Settings
User Management

Eye Mobile Threat Prevention

Dashboard | Devices | Users | Apps | Policies | Settings

App Management

🔍 By title, package name, publisher, or MD5

1 - 50 of 3345  << < 1 2 3 4 5 > >>

| | APP NAME | PACKAGE NAME | PUB | DEVICES | OS | VER | Level | POLICY |
|---|---|---|---|---|---|---|---|---|
| ☐ | PGA TOUR | com.pgatour.ipad | PGATOUR.com LLC | 1 | 8.3 | 67 | 0 | ◎◎ |
| ☐ | Living Social | com.livingsocial.deals | — | 1 | 8.3 | 3400 | 0 | ◎◎ |
| ☐ | CWT To Go | com.worldmate.cwt2go | Carlson Wagonlit Travel | 1 | 8.3 | 9.0.5 | 0 | ◎◎ |
| ☐ | YouCam Perfect | com.cyberlink.youperfect | — | 1 | lollipop | 4.6.1 | 0 | ◎◎ |
| ☐ | Qantas | au.com.qantas.qantas | — | 2 | lollipop | 2.4.2 | 0 | ◎◎ |
| ☐ | Grid Watch | com.news24.loadshedding | — | 1 | lollipop | 1.7 | 0 | ◎◎ |
| ☐ | Plex | com.plexapp.android | — | 1 | lollipop | 4.6.3.383 | 0 | ◎◎ |
| ☐ | CastBox | com.liquidum.castbox | — | 1 | lollipop | 1.3.3 | 0 | ◎◎ |
| ☐ | CPU-Z | com.cpuid.cpu_z | — | 1 | KK | 1.13 | 0 | ◎◎ |
| ☐ | OSN Play | loko.mediaservicesframe... | — | 1 | KK | 3.1 | 0 | ◎◎ |
| ☐ | Adobe Acrobat | com.adobe.reader | — | 1 | lollipop | 15.2.0 | 0 | ◎◎ |
| ☐ | Tumblr | com.tumblr | — | 1 | KK | 3.9.0.15 | 0 | ◎◎ |
| ☐ | SFR TV | fr.sfr.sfrtv | — | 1 | 8.3 | 6.1.3.1 | 0 | ◎◎ |
| ☐ | Fortuneo | com.fortuneo.fortuneo | Fortuneo | 1 | 8.3 | 4.3.0.2 | 0 | ◎◎ |
| ☐ | Viadeo | com.viadeo.viadeoapp | Viadeo | 1 | 8.3 | 3.3.5.4 | 0 | ◎◎ |
| ☐ | lafourchette | com.c4mprod.la | LaFourchette SA | 1 | 8.3 | 1 | 0 | ◎◎ |

USER

PGA TOUR ○○○

| | |
|---|---|
| Package | com.pgatour.ipad |
| MD5 | 123456789 |
| SHA1 | 123456789 website.com |
| Publisher | PGATOUR.com LLC |
| Version | 67 |
| Signer ID | Apple iPhone OS Application Signing |
| iOS att ack | |
| OS | 8.3 |
| Cost | Free |
| #Installs | 1 |
| Sync | 2015-07-28 16:15:611 |
| Status | Analyzed |

1 BEHAVIORS

⚠ Modifies calendar
The app changes or deletes events on the users calendar.

MOBILE APPLICATION RISK ANALYSIS

CROSS-REFERENCE TO RELATED APPLICATIONS

This application claims the benefit of priority to U.S. Provisional Application No. 62/205,612, filed Aug. 14, 2015, the entire contents of which are incorporated by reference herein.

FIELD

Embodiments of the disclosure relate to the field of cyber security. More specifically, embodiments of the disclosure relate to a system for detecting anomalous, or more specifically, unwanted or malicious behavior associated with mobile applications on endpoint devices.

GENERAL BACKGROUND

Over the last decade, malicious software has become a pervasive problem for Internet users as many networked resources include vulnerabilities that are subject to attack. For instance, over the past few years, more and more vulnerabilities are being discovered in software that is loaded onto endpoint devices with network connectivity. In particular, mobile applications installed on endpoint devices have become ubiquitous and serve as a medium for which to attack a network. For example, a mobile application may include vulnerabilities that expose the endpoint device to attacks. These vulnerabilities may be exploited by allowing a third-party to gain access to one or more areas within the network not typically accessible. For example, a third-party may exploit a software vulnerability to gain unauthorized access to email accounts and/or data files.

While some software vulnerabilities continue to be addressed through updates to mobile applications (e.g., software patches), prior to the installations of such updates, endpoint devices on a network will continue to be targeted for attack through software vulnerabilities and/or by exploits, namely malicious computer code that attempts to acquire sensitive information, adversely influence, or attack normal operations of the network device or the entire enterprise network by taking advantage of a vulnerability in computer software.

As mentioned above, malware may be placed in objects embedded in mobile applications (applications downloaded by an endpoint device, possibly from an application store organized by a mobile device provider) that may compromise the endpoint device or its operating environment. For example, a mobile application downloaded (e.g., installed) on an endpoint device (e.g., mobile device) may include one or more vulnerabilities that enable the creator and/or distributor of the mobile application to access one or more storage areas of the endpoint device (e.g., contact list or password storage). As another example, a vulnerability in a mobile application may enable the creator and/or distributor to access the network to which the mobile device is connected (e.g., an enterprise network) through the endpoint device without proper permissions. Stated generally, malware present within the mobile application itself may affect the endpoint device, an enterprise network to which the endpoint device is connected, and/or other endpoint devices connected to the enterprise network in a negative or anomalous manner.

Based on the shortcomings set forth above, current malware detection systems do not provide endpoint device users and/or network administrators with a full and accurate understanding of the maliciousness, or risk thereof, of a mobile application or one or more endpoint devices connected to the enterprise network.

BRIEF DESCRIPTION OF THE DRAWINGS

Embodiments of the invention are illustrated by way of example and not by way of limitation in the figures of the accompanying drawings, in which like references indicate similar elements and in which:

FIG. 7 is an exemplary embodiment of a mobile application risk analysis system screen that illustrates an overview of the users connected to the network 110 via a mobile device.

FIG. 8 is an exemplary embodiment of a mobile application risk analysis system screen that illustrates an overview of the applications installed on mobile devices connected to the network 110.

DETAILED DESCRIPTION

Figure 1A:
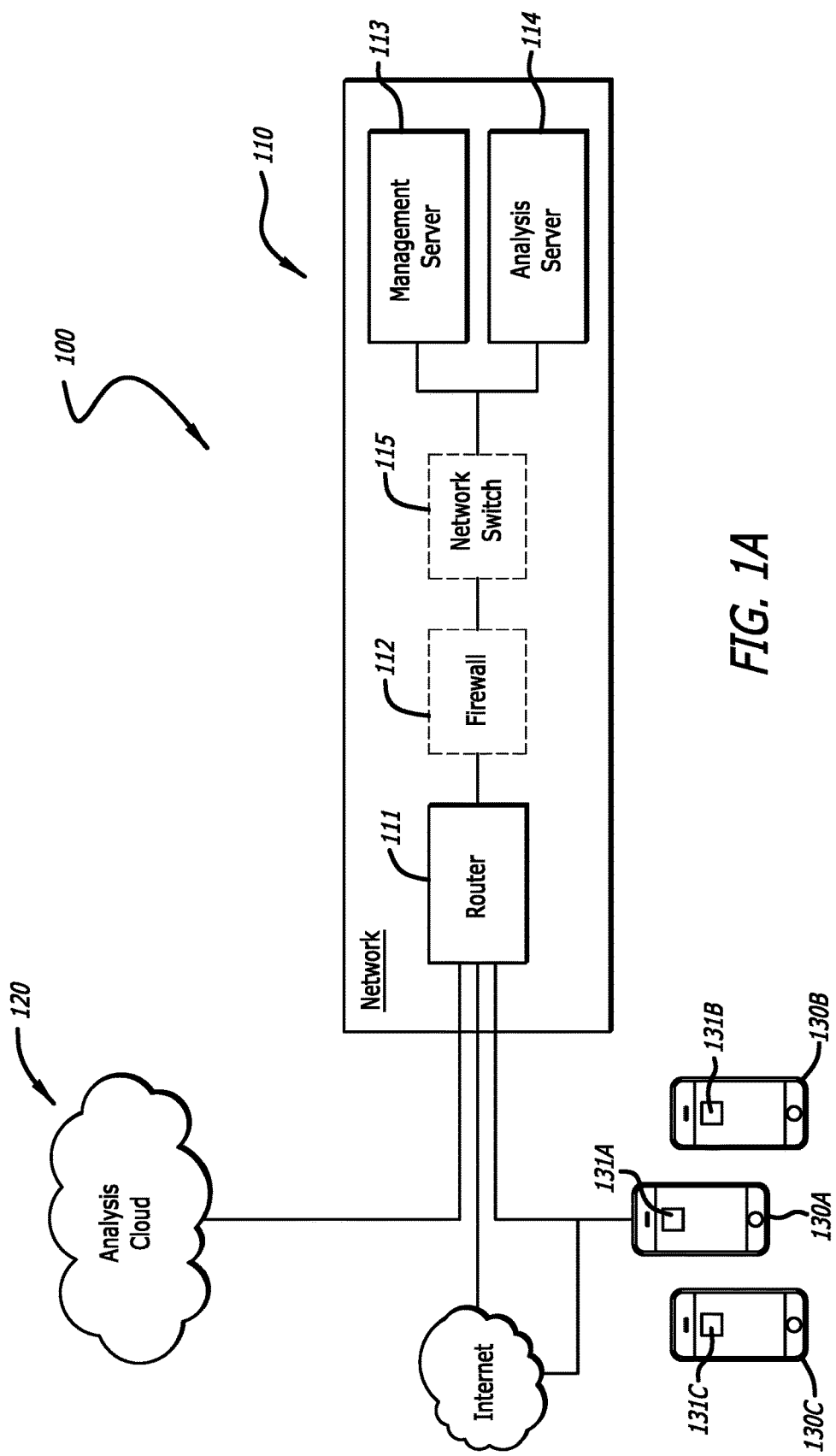
FIG. 1A is an exemplary block diagram of a mobile application risk analysis system (RAS) 100 including a management server 113, an analysis server 114, an analysis cloud 120 and one or more mobile agents 131A-131C.

Various embodiments of the disclosure relate to a Mobile Application Risk Analysis System (RAS) that improves malware detection, particularly, in the case of mobile applications installed on endpoint devices (wherein "malware" may collectively refer to exploits, software that initiates unwanted behaviors and/or malicious code). In one embodiment of the disclosure, the mobile application RAS comprises a mobile agent installed on an endpoint device that is operable with a management server and an analysis server and in some embodiments, is interoperable with logic running on one or more servers associated with cloud computing services (hereinafter referred to as an "analysis cloud"). In order to determine the threat level of an endpoint device connected to the enterprise network, information on the applications installed the endpoint device is collected and a threat level is determined based on at least one or more of: (1) the risk level of one or more applications, (2) usage information of one or more applications, (3) the risk level of network traffic generated by the endpoint device, and/or (4) the configuration of the endpoint device (e.g., whether restrictions of the endpoint have been altered such that the user is permitted root access to the operating system of the endpoint, often referred to as jailbroken or rooted).

In one embodiment, the mobile agent determines whether a new mobile application has been installed on an endpoint device and/or whether a new version of a previously installed application has been installed on the endpoint device (hereinafter referred to as "application"). This information is transmitted to the management server, which queries a local database and/or a database in the analysis cloud containing a risk level for each application installed on the device. A threat level determination logic of the management server may then determine a threat level of the endpoint device based on at least one or more of: (1) the risk level of one or more applications, (2) usage information of one or more applications, (3) the risk level of network traffic generated by the endpoint device, and/or (4) the configuration of the endpoint device. In one embodiment, a weighting logic may assign a weight to the factors considered in determining the threat level of the endpoint device.

In one instance, a risk level may be unknown for an application. In such an instance, the analysis cloud may obtain a copy of the executable of the specific version of the application installed on the endpoint device and perform a static analysis and/or a dynamic analysis to determine a risk level for the application. Alternatively, or in addition to, the analysis server may obtain a copy of the executable of the specific version of the application for which the risk level is unknown and perform a dynamic processing including a webview analysis in which operations associated with the processing of an embedded Internet browser (hereinafter "embedded web browser") are analyzed. A risk level of the application is determined by the analysis server and provided to the management server. In one embodiment, the management server may determine an overall risk level for the application based on (i) the risk level determined by the analysis cloud and/or (ii) the risk level determined by the analysis server. Herein, the dynamic processing in both the analysis cloud and the analysis server may occur within one or more virtual machine instances (VMs), which may be provisioned with a guest image associated with a prescribed software profile. Each guest image may include a software application and/or an operating system (OS). Each guest image may further include one or more monitors, namely software components that are configured to observe and capture run-time behavior of an object under analysis during processing within the virtual machine. Additionally, a static analysis may include a rules-based analysis using heuristics and/or comparisons of one or more signatures. In one embodiment, the static analysis may reveal whether the application includes an embedded web browser. Additional information regarding operations performed in the analysis cloud may be found in U.S. patent application Ser. No. 13/775,168, entitled "Framework for Efficient Security Coverage of Mobile Software Applications," which is hereby incorporated by reference in its entirety.

Herein, each VM may be configured with a guest image to simulate a particular endpoint device. Specifically, the VMs may be configured with different operating systems, different applications, different versions of a common operating system or different versions of a common application. Herein, each VM within the analysis cloud may include application analysis logic while each VM within the analysis server may include a mobile webview emulator. When an application is determined to include an embedded web browser, the application is launched within one or more VMs within the analysis server and the mobile webview emulator is launched in order to analyze the operations associated with the embedded web browser. In addition, actual network traffic may be used during dynamic processing of the application within the analysis server to determine a level of maliciousness of the web traffic attempting to pass through the embedded web browser and enter the enterprise network. The employment of the mobile webview emulator will be discussed in detail below.

A webview emulator may be a software module (i.e., logic) that runs directly in a VM to emulate the functionality of an embedded Internet (e.g., "web") browser, or it may be a wrapper application containing an embedded webview, which may run in a mobile operating system (OS) emulator. In one embodiment, the webview emulator is configured to emulate the Android® OS with a wrapper application running inside the emulated Android® OS. In some embodiments, the emulated Android® OS may be configured to match the configuration of the mobile device under analysis.

In one embodiment, the mobile application RAS operates in a first mode wherein the mobile agent installed on a mobile device may capture network traffic generated and received by the mobile device. A copy of the captured network traffic is made by the mobile agent prior to the mobile device processing the network traffic and the copy may be transmitted to the management server and/or the analysis server. In one instance, the copy of the network traffic captured by the mobile agent is used in the dynamic analysis of the applications installed on the mobile device in the analysis server. In particular, the webview emulator may utilize the copy of the actual network traffic to determine a risk score for the network traffic of the mobile device.

In a second embodiment, the mobile application RAS operates in a second mode wherein a mobile device may be located within the network and a network switch captures the network traffic of the mobile device. The network switch makes a copy of the network traffic prior to passing the network traffic to the mobile device or to the router for transmission outside of the network. The copy is subsequently passed to the analysis server for processing. The network traffic may be stored in a storage device located on the analysis server.

In third embodiment, the mobile application RAS operates in a third mode wherein a mobile device is located within the network, the management server and analysis server may be considered "in-line" with the mobile device such that the network traffic is analyzed by, at least, the management server and analysis server prior to being processed by the mobile device. For example, the router may receive network traffic directed to the mobile device. The router may pass at least a portion of the network traffic to the analysis server such that the analysis server may perform a dynamic analysis on the network traffic and determine a risk level for the network traffic. The risk score, and optionally the dynamic analysis results, may be transmitted to the management server and the management server may determine a threat level of the mobile device based on the information provided by the analysis server.

As used herein, the transmission of data may take the form of transmission of electrical signals and/or electromagnetic radiation (e.g., radio waves, microwaves, ultraviolet (UV) waves, etc.).

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. In the alternative, malware may correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list from an endpoint device to a cloud storage without receiving permission from the user.

The term "processing" may include launching a mobile application wherein launching should be interpreted as placing the mobile application in an open state and performing simulations of actions typical of human interactions with the mobile application. For example, the mobile application, "Facebook," may be processed such that the mobile application is opened and actions such as selecting to view a Friend's profile, scrolling through a Newsfeed, and selecting and activating a link from the Newsfeed are performed.

The term "mobile agent" should be construed as a software application or module that is downloadable and installable by an endpoint device. A mobile agent may be a software application that is specifically designed to run on an operating system for an endpoint device. Additionally, a mobile agent may provide a graphical user interface (GUI) for the user of the endpoint device.

The term "network device" should be construed as any electronic device with the capability of connecting to a network, downloading and installing mobile applications. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, etc. Herein, the terms "network device," "endpoint device," and "mobile device" will be used interchangeably. The terms "mobile application" and "application" should be interpreted as software developed to run specifically on a mobile network device.

The term "malicious" may represent a probability (or level of confidence) that the object is associated with a malicious attack or known vulnerability. For instance, the probability may be based, at least in part, on (i) pattern matches; (ii) analyzed deviations in messaging practices set forth in applicable communication protocols (e.g., HTTP, TCP, etc.) and/or proprietary document specifications (e.g., Adobe PDF document specification); (iii) analyzed compliance with certain message formats established for the protocol (e.g., out-of-order commands); (iv) analyzed header or payload parameters to determine compliance, (v) attempts to communicate with external servers during dynamic processing, (vi) attempts to access memory allocated to the application during dynamic processing, and/or other factors that may evidence unwanted or malicious activity.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detecting malware or anomalous behaviors associated with mobile applications installed on endpoint devices connected to an enterprise network. As this invention is susceptible to embodiments of many different forms, it is intended that the present disclosure is to be considered as an example of the principles of the invention and not intended to limit the invention to the specific embodiments shown and described.

II. General Architectures of Mobile Application RAS

Referring to FIG. 1A, an exemplary block diagram of a mobile application risk analysis system (RAS) 100 including a management server 113, an analysis server 114, an analysis cloud 120 and one or more mobile agents 131A-131C is shown. As is seen in FIG. 1A, the management server 113 and the analysis server 114 are located within the network 110. The network 110 may include a public network such as the Internet, a private network (e.g., a local area network "LAN", wireless LAN, etc.), or a combination thereof. The network 110 additionally includes a router 111 and an optional firewall 112. The router 111 serves to receive data, e.g., packets, transmitted via a wireless medium (e.g., a Wireless Local Area Network (WLAN) utilizing the Institute of Electrical and Electronics Engineers (IEEE) 802.11 standard) and/or a wired medium from the analysis cloud 120, the endpoint devices 130 and/or the mobile agents 131A-131C. As is known in the art, the router 111 may provide access to the Internet for devices connected to the network 110.

Figure 2A:
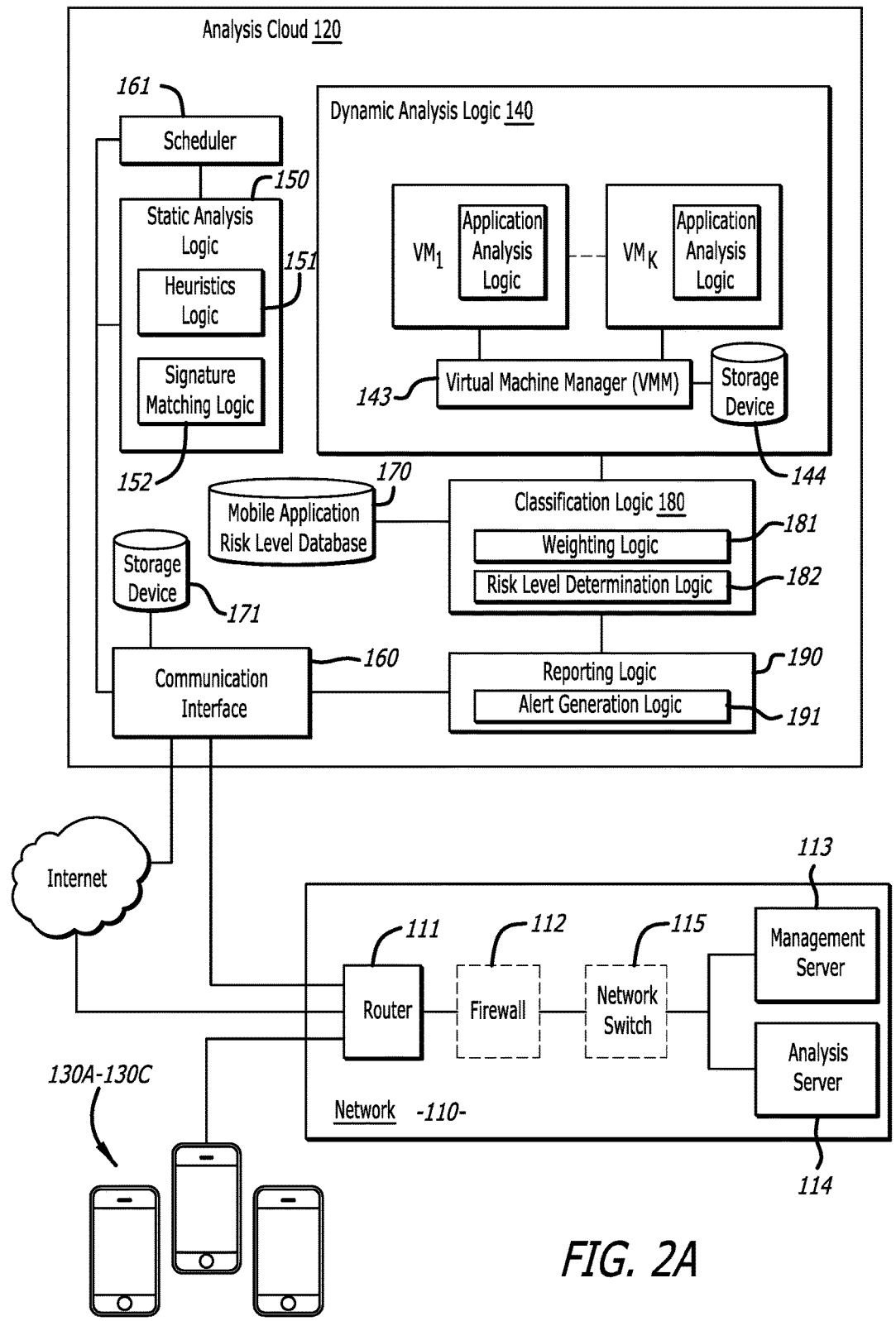
FIG. 2A is an exemplary block diagram of a mobile application RAS 100 deployed between a plurality of mobile devices 130, an enterprise network 110 and an analysis cloud 120.

The management server 113 includes a communication interface logic 240, a local database 230, a classification logic including a weighting logic 211 and a threat level determination logic 212, and an alert generation logic 220. The analysis server 114 includes a communication interface 250, virtual machines VM_$1_1$ 271-VM_$1_j$ 272, wherein each include an instance of a mobile webview emulator, a virtual machine manager (VMM) 270, a storage device 280, and a classification logic 260 including a risk level determination logic 261 and a weighting logic 262. As is illustrated in FIG. 2A, the management server 113 and the analysis server 114 are communicatively coupled to the router 111 via the optional network switch 115 and the optional firewall 112 using the communication logic 240 and the communication interface 250, respectively.

In one embodiment, the mobile agent 131A, running in the background of mobile device 130A, detects that a new application has been downloaded and installed (both are hereinafter referred to as "installed") on the mobile device 130A. Subsequently, the mobile agent 131A may generate a hash, or other derivative representation, of the executable of the new application and transmit the hash, or other derivative representation, to the management server 113. Additionally, the mobile agent 131A may generate and transmit the hash, or other derivative representation, of each application installed on the mobile device 130A to the management server 113. Furthermore, while running in the background, the mobile agent 131A may track the usage information of one or more of the applications installed on the mobile device 130A. The mobile agent 131A may also transmit the usage information collected to the management server 113. In another embodiment, the mobile agent 131A may transmit an identifier of each of the applications as the derivative representation. For example, if the mobile agent 131A is running a version of iOS (the mobile operating system associated with Apple® products), the mobile agent 131A may transmit an identifier known as a "Bundle ID" for each application. This embodiment may be referred to as a push-operation performed by the mobile agent 131A.

In a second embodiment, the management server 113 may periodically poll each of the mobile agents 131A-131C for (i) the hash value, or other derivative representation, of the executables of each of the applications installed on the corresponding mobile device 130A-130C and/or (ii) the usage information of one or more of the applications installed on the corresponding mobile device 130A-130C. This embodiment may be referred to as a pull-operation performed by the management server 113.

Subsequently, the management server 113 may query a local database 230 for a risk level of each of the applications installed on the mobile device 130A. According to one embodiment, the local database 230 may compare the hash value, or other derivative representation, of the executables of each of the applications installed on the mobile device 130A to the hash values, or other derivative representations, stored on the local database 230. Performing a comparison of hash values provides the management server 113 to determine whether any small change has been to the executable of an application. For example, if the executable installed by the mobile device 130A includes a minor alteration from the executable of the application whose hash value is stored in the local database 230 or the is corrupted, the hash comparison will not return a match.

Alternatively, the management server 113 may compare the Bundle ID of each of the applications installed on the mobile device 130A with Bundle IDs stored on a local database 230. The query to the local database 230, if successful, will return the risk level for one or more applications. It is contemplated, in addition to or in the alternative to queries of the local database 230, the management server 113 may conduct such risk level queries of a database of the analysis cloud 120 (e.g., the mobile applications risk level database 170 of FIG. 2).

In some instances, a risk level for one or more applications are unknown (e.g., an application was installed that has not been analyzed by the mobile application RAS or a new version of an application that was previously analyzed was installed wherein the new version has not been analyzed, hereinafter "new application"). As will be discussed in detail below, the management server 113 will coordinate processing of the new application to determine a risk level of the new application. The analysis cloud 120 may perform a static and/or dynamic processing on the new application and/or the analysis server 114 may perform a dynamic analysis on the new application. Subsequently, the management server 113 may be provided with a risk level of the new application or the management server 113 may combine processing results from the analysis server 114 and the analysis cloud 120 to determine a risk level for the new application.

Upon receiving the risk level of each application running on the mobile device 130A, the management server 113 determines a threat level of the mobile device 130A based on at least one of: (1) the risk level of one or more applications, (2) usage information of one or more applications, and/or (3) the configuration of the endpoint device. In one embodiment, the usage information is used to incrementally augment the determination of the risk level of one or more applications and/or the determination of the threat level of a mobile device. For example, the usage information for an application installed on a mobile device may supplement the risk level determined for that application, or it may be factor into the weight assigned to the risk level of that application.

The management server 113 may notify the user of the mobile device 130A and/or the network administrator through electrical signaling (e.g., text messages, email, audio or video messaging, etc.) of, inter alia, (a) the risk level of one or more applications installed on the mobile device 130A, and/or (b) the threat level of the mobile device 130A.

As will be discussed below with FIGS. 5-16, one or more of the management server 113, the mobile agents 131A-131C and/or the analysis cloud 120 may generate a graphical user interface (GUI) in order to present data associated with the risk level of one or more applications and/or the threat level of one or more mobile devices connected to the network 110. The alert generation logic 220 of the management server 113, the alert generation logic 191 of the analysis cloud and alert generation within the mobile devices 130A-130C (not shown) generate the GUIs shown below.

Figure 1B:
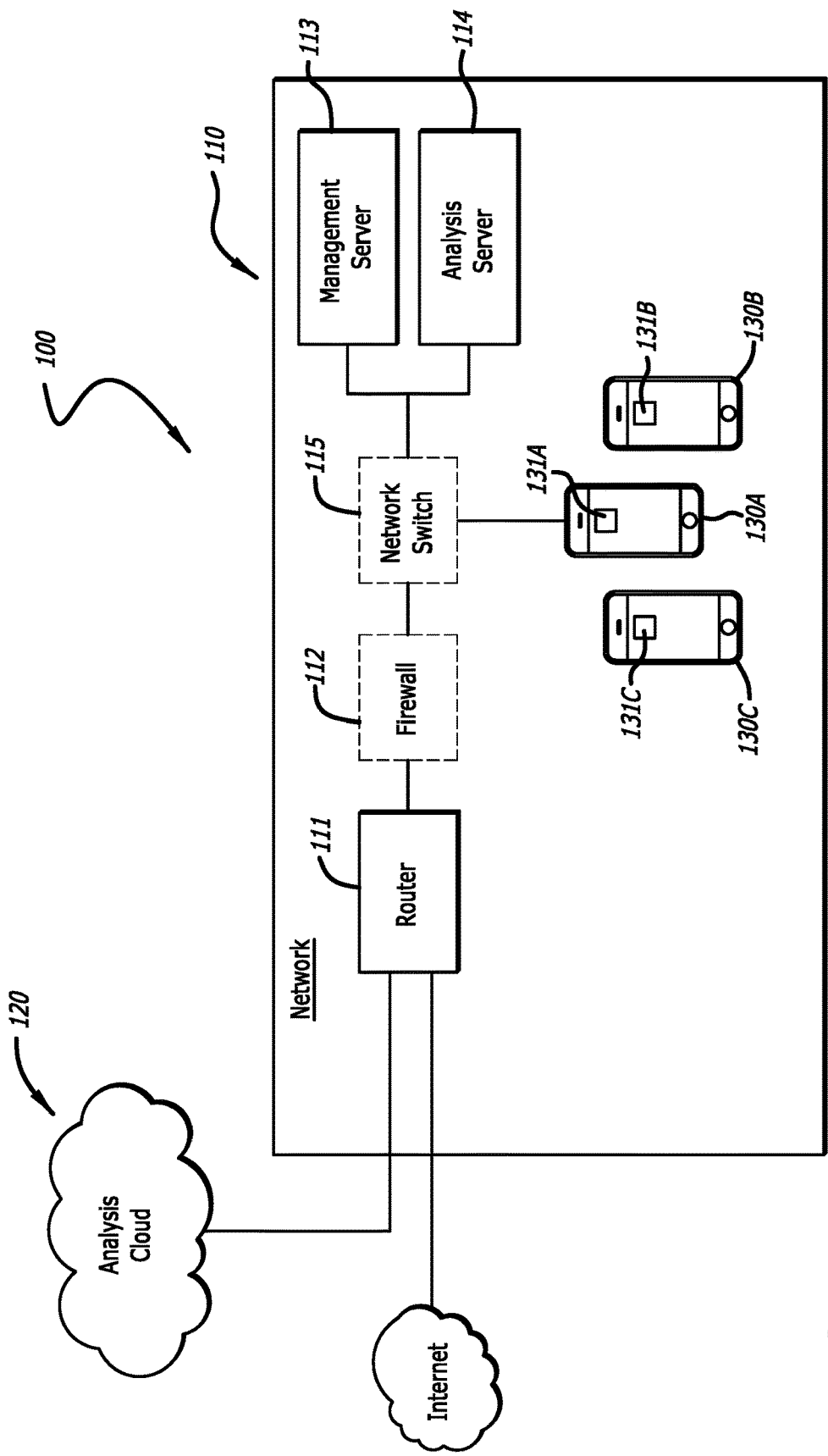
FIG. 1B is a second exemplary block diagram of a mobile application risk analysis system (RAS) 100 including a management server 113, an analysis server 114, an analysis cloud 120 and one or more mobile agents 131A-131C.

Referring to FIG. 1B, a second exemplary block diagram of a mobile application risk analysis system (RAS) 100 including a management server 113, an analysis server 114, an analysis cloud 120 and one or more mobile agents 131A-131C is shown. In the embodiment illustrated in FIG. 1B the mobile devices 130A-130C are shown to be connected to the network 110. This may be construed as, for example, the mobile devices 103A-130C being within a physical proximity to the router 111 such that the mobile devices 130A-130C receive radio waves from the router 111.

Referring to FIG. 2A, an exemplary block diagram of a mobile application RAS 100 deployed between a plurality of mobile devices 130A-130C, an enterprise network 110 and a cloud computing service (e.g., "analysis cloud") 120 is shown. As discussed above, each mobile device 130A-130C that connects to the network 110 includes a mobile agent 131A-131A running as background application to track the installations of mobile applications on each mobile device 130A-130C and track the usage of each mobile application installed thereon. Such information may be periodically transmitted to the management server 113 (e.g., via a push action by one of the mobile agents 131A-131C or a pull action by the management server 113).

Alternatively, the transmission may be aperiodic based on a variety of different factors such as predetermined application usage thresholds or manual instructions initiated by a network administrator or a user of a mobile device. In one embodiment, when a mobile device has not installed a mobile agent, the mobile device may not be granted access to the enterprise network 110 or may be granted limited access to the network 110 (e.g., given access only to a "guest network" with limited accessibility).

The network 110 includes a router 111, an optional firewall 112, a management server 113, an analysis server 114 and an optional network switch 115 as previously shown in FIGS. 1A-1B. The router 111 acts as a communication interface between, at least, the management server 113 and (i) the mobile agents 131A-131C and (ii) the analysis cloud 120. In one embodiment, the network switch 115 may capture the network traffic, make a copy of the network traffic, pass the network traffic to the appropriate endpoint device via the router and pass the copy of the network traffic to the analysis server. In another embodiment, the network switch 115 may capture the network traffic and pass the network traffic to the analysis server for processing prior to passing the network traffic to the appropriate mobile device. In such an embodiment, the network traffic will only be passed to the appropriate mobile device if the analysis of the network traffic does not indicate that the network traffic is associated with a malicious attack or anomalous or unwanted behavior. The management server 113 may receive transmissions of information pertaining to applications of the mobile device (for example, one or more of the usage information of one or more applications, the hash value, or other derivative representation, of the executable of one or more applications and/or an identifier of each of the applications, hereinafter referred to as "application data").

Upon receiving the application data, the management server begins a process of determining the threat level of the mobile device 130A-130C, corresponding to the received application data (e.g., the mobile device 130A). In one embodiment, the management server 113 queries the local database 230 for the risk level of the applications installed on the mobile device 130A (determined by parsing the received application data). If the risk level for one or more of applications is not stored in the local database 230, the management server 113 may query the mobile application risk level database 170 of the analysis cloud 120. In a second embodiment, the management server 113 does not include a local database and therefore immediately queries the mobile application risk level database 170.

When the risk level for each application is known, the management server 113 determines the threat level of the mobile device 130A based on, at least, (1) the risk level of one or more applications, (2) usage information of one or more applications, and/or (3) the configuration of the mobile device 130A.

When the risk level for one or more applications is unknown, the management server 113 coordinates analysis of the one or more applications in the analysis cloud 120 and/or the analysis server 114. For example, the management server 113 may transmit an instruction to the analysis cloud 120 to perform an analysis on a particular application and transmit an instruction to the analysis server 114 to perform a webview analysis on the applications installed on the mobile device 130A. Upon completion of the analysis of the one or more applications, the management server 113 receives the risk level for the applications and determines a threat level for the mobile device 130A. The management server 113 may then generate alerts to notify the user of the mobile device 130A and/or a network administrator in the same manner as discussed below with the analysis cloud 120.

In one embodiment, the management server 113 may generate and transmit one or more instructions to the mobile agent 131A depending on the determined threat level, one or more behaviors of one or more applications and/or the network policy settings, which may be stored locally at the management server 113 or in the analysis cloud 120. The one or more instructions may disconnect mobile device 130A from the network and prevent future connections to the network until a particular application has been removed from the mobile device 103A. In another embodiment, an instruction may instruct the mobile agent 131A to prevent an application from opening. For example, when the mobile device 130A is running a first operating system (e.g., a version of an Android operating system), the management server 113 may determine that a policy has blacklisted a particular behavior and transmit an instruction to the mobile agent 131A installed on the mobile device 130A to prevent the particular behavior (e.g., access cloud storage using any application on the mobile device 130A).

In another embodiment, when the mobile device 130A is running a second operating system (e.g., a version of Apple® iOS™), the management server 113 may not be able to prevent particular behaviors of applications but may instead prevent the mobile device 130A from accessing the network 110 altogether. For example, if an application includes a blacklisted behavior (e.g., accessing cloud storage), the management server 113 may prevent the mobile device 130A from accessing the Internet via the network 110 (i.e., not permitting the mobile device 130A to connect) and therefore preventing the network 110 from being exposed to any risks associated with the blacklisted behaviors of applications of the mobile device 130A. In one embodiment, a mobile device management (MDM) server acts as an intermediary to receive the instruction from the management server 113 and prevent the mobile device 130A from accessing the network 110.

The analysis server 114 includes one or more virtual machines (VMs) $VM\_1_1$-$VM\_1_j$ wherein each VM includes an instance of a mobile webview emulator. When a risk level for an application is unknown and the application includes an embedded web browser, the analysis server 114 performs a dynamic analysis on the application in one or more of $VM\_1_1$-$VM\_1_j$. When dynamic processing begins on a first application within, for example, the $VM\_1_j$, the mobile webview emulator is launched in the $VM\_1_j$ in order to emulate the processing of web traffic in the embedded web browser of the application. The $VM\_1_j$ may use actual network traffic of the network 110 during dynamic processing or may use a copy of the actual network traffic. During the dynamic processing, the network traffic is analyzed. In one embodiment, the analysis server 114 may record, inter alia, (i) the location from where the traffic originated (e.g., a trusted or an untrusted website), (ii) the location to where the traffic is being transmitted, and/or (iii) actions taken by received network traffic (e.g., attempts to access particular storage locations, install malware, open anomalous files, attempts to open additional Internet connections (e.g., TCP/IP connections), etc.

When the dynamic processing finishes, the risk level determination logic 261 of the analysis server 114 determines a risk level of the network traffic generated by the dynamic processing (i.e., the network traffic that would have been generated by the mobile device 130A). The determination of the risk level of the network traffic may be based on, inter alia, (i) the location from where the traffic originated (e.g., a U.S. government website compared to a Chinese government website), (ii) the location to where the traffic is being transmitted, and/or (iii) actions taken by received network traffic (e.g., executable code contained in the network traffic attempts to launch and exploit a vulnerability in the webview). The risk level of the network traffic is then attributed to the mobile device 130A and passed to the management server 113. The risk level of the network traffic attributed to the mobile device 130A may be considered in the determination of the threat level of the mobile device 130A.

The analysis cloud 120 includes static analysis logic 150, dynamic analysis logic 140, a scheduler 161, a communication interface 160, a mobile application risk level database 170, classification logic 180 and reporting logic 190. As shown, the analysis cloud 120 is communicatively coupled with the network 110 via the communication interface 160, which directs at least a portion of signaling from the network 110 to the scheduler 161 which in turn may direct a portion of the signaling to the static analysis logic 150, the dynamic analysis logic 130 and/or the storage device 171. The scheduler 161 may configure one or more of $VM_1$-$VM_K$ (K≥1) with selected software profiles. For instance, the application data may be used to determine which software images (e.g., application(s)) and/or operating systems to be fetched from the storage device 144 for configuring operability of the $VM_1$-$VM_K$.

As shown in FIG. 2A, the communication interface 160 receives a transmission from the management server 113 and converts the received application data into a format, as needed or appropriate, on which analysis by the static analysis logic 150 and/or the dynamic analysis logic 140 may be conducted. This conversion may involve decompression of the application data, decompilation of the executable of an application, extraction of specific data associated with the application, and/or emulation of the extracted data (like Javascript™).

Further, the static analysis logic 150 may include one or more software modules that (e.g., heuristics logic 151 and signature matching logic 152), when executed by a controller(s), analyzes characteristics associated with the application under analysis. Such static analysis may include one or more checks being conducted on the executable of the application without its execution. Examples of the checks may include heuristics, performed by the heuristic logic 131, which are based on rules or policies as applied to the application executable and may determine whether one or more portions of the application executable are associated with anomalous or suspicious characteristics associated with known malware (e.g., a particular developer associated with known malware, or a particular source or destination address, etc.). Another example may include signature matching, performed by the signature matching logic 132, which may include determinative rule-based analysis such as comparisons with entries on a blacklist and/or a whitelist. In one embodiment, although not shown, the static analysis logic 150 (and/or the dynamic analysis logic 140) may include one or more controllers (e.g., processing circuitry such as one or more processors).

The dynamic analysis logic 140 may include a virtual machine monitor (VMM) 143, a storage device 144 and the $VM_1$-$VM_K$ (K≥1). The dynamic analysis logic 140 provides for the processing of an executable of an application in one or more of $VM_1$-$VM_K$ managed by the VMM 143. In particular, the scheduler 161 may select the configurations of one or more of $VM_1$-$VM_K$ and the instance of the application analysis logic within each VM may monitor the processing of the application looking for anomalous and/or malicious behavior resulting from the processing of the application. For example, the application analysis logic may perform simulated human interactions during processing of the application and attempt to make the application request to access cloud storage. In an embodiment in which a policy blacklists the behavior of accessing cloud storage, the application analysis logic would record this request by the application (e.g., granting the request to determine whether the access would be malicious or denying the request) and continue the processing.

The classification logic 180 may be configured to receive the static analysis results and/or the dynamic analysis results (which may also be stored in the storage device 144). According to one embodiment of the disclosure, the classification logic 180 comprises the weighting logic 181 and the risk level determination logic 182. The risk level determination logic 182 is configured to determine a probability (or level of confidence) that an application will be used in the exploitation of a vulnerability, the initiation of unwanted behavior or to facilitate a malicious attack, which may be represented as a predefined category (e.g., high, medium or low) or as a numerical value. More specifically, based on the detection of particular behaviors of the application during the dynamic analysis, the risk level determination logic 182 generates a value that may be used, in part, to identify the threat level of the mobile device on which the application is installed (the likelihood that the mobile device would pose as a vulnerability to the network 110 enabling a malicious attack thereon).

The weighting logic 181 may be configured to apply weighting to results provided from dynamic analysis logic 140 (e.g., particular behaviors may be weighted greater than others) and/or static analysis logic 150. Thereafter, the classification logic 180 may route classification results comprising the weighting and/or prioritization applied to the static analysis results and dynamic analysis results to the reporting logic 190. The classification results may include the details of one or more applications denoted in the application data, classification of any behaviors detected into categories (e.g., malware, vulnerabilities, code obfuscation, etc.), and/or describe the behaviors and/or threats posed.

In one embodiment, the static analysis logic 150 is optional and may not even be present in the analysis cloud 120. In another embodiment, the static analysis logic 150 may analyze one or more portions of the application data after the dynamic analysis has completed. For example, the dynamic analysis may find that a particular application exhibited one or more blacklisted behaviors, or behaviors known to be associated with malware and/or vulnerabilities. The static analysis logic 150 may analyze the data associated with only that particular application in order to supplement the results of the dynamic analysis. Static analysis logic 150 can identify regions of interest that are deserving of dynamic analysis and the dynamic analysis logic 140 may focus its analysis at the identified regions of interest. Regions of interest may include, but are not limited or restricted to, portions of the executable code that evidence malware, an exploitation of a vulnerability, or the initiation of anomalous or unwanted behavior. Regions of interest may be identified using the heuristics logic 151 and/or the signature matching logic 152.

The reporting logic 190 includes alert generation logic 191 is adapted to receive information from the classification logic 180 and generate alerts that identify to a user of an endpoint device, network administrator or an expert network analyst risk level of a particular application (e.g., if the application is known to be associated with a malicious attack or have a known vulnerability). The alerts may include various types of messages, which may include text messages and/or email messages, video or audio stream, or other types of information over a wired or wireless communication path.

Figure 2B:
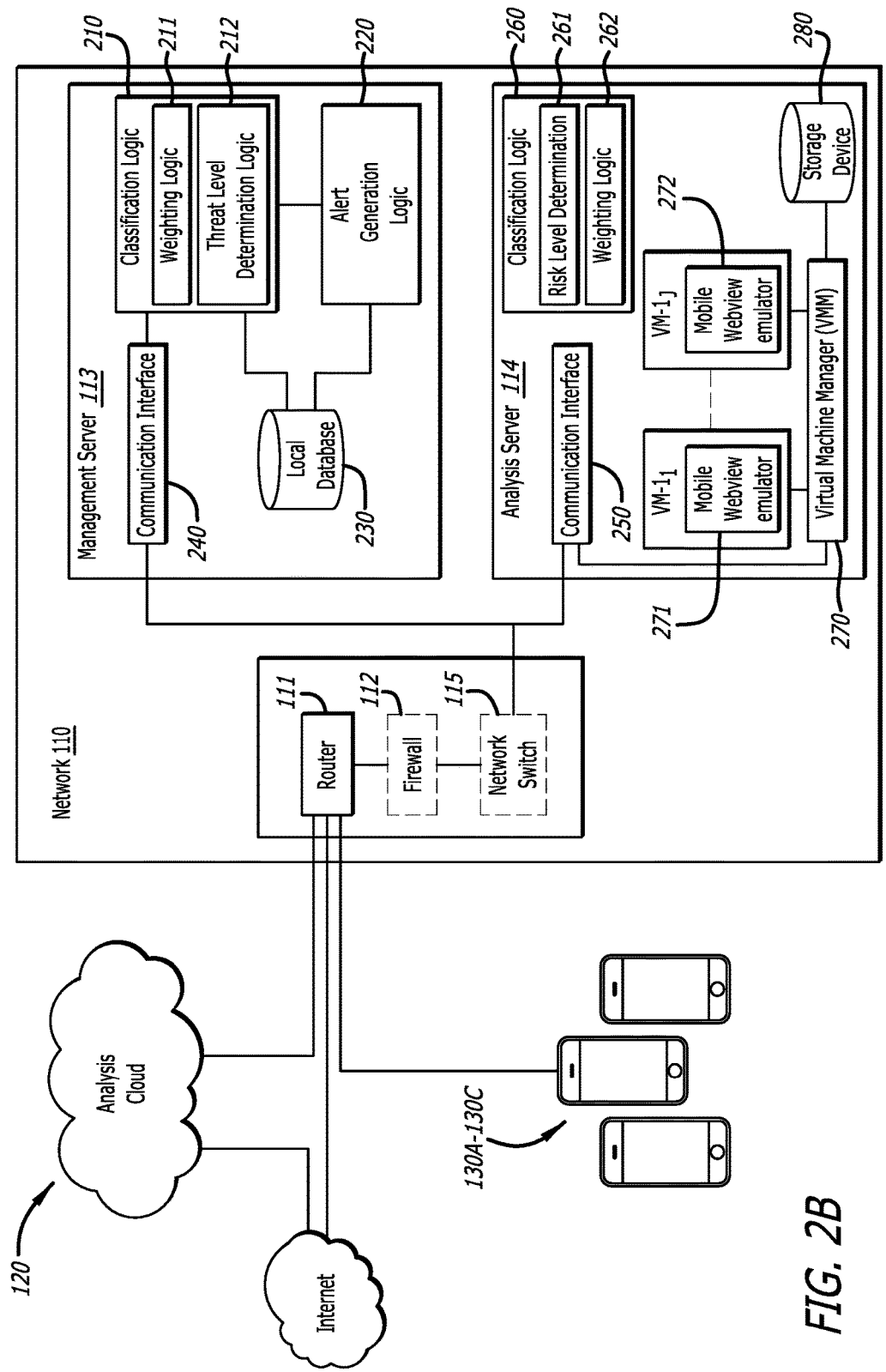
FIG. 2B is a second exemplary block diagram of a mobile application RAS 100 deployed between a plurality of mobile devices 130, an enterprise network 110 and an analysis cloud 120.

Referring to FIG. 2B, a second exemplary block diagram of a mobile application RAS 100 deployed between a plurality of mobile devices 130, an enterprise network 110 and an analysis cloud 120 is shown. As shown FIG. 2B, the communication interface 240 of the management server 113 receives transmissions from the the analysis cloud 120, the mobile devices 130A-130C and the analysis server 114 and converts the received data into a format, as needed or appropriate, on which a determination by the classification logic 210 may be made.

The classification logic 210 may be configured to receive application data from the mobile devices 130A-130C and results of processing by the analysis cloud 120 and the analysis server 114. According to one embodiment of the disclosure, the classification logic 210 comprises the weighting logic 211 and the threat level determination logic 212. The threat level determination logic 212 is configured to determine a probability (or level of confidence) that a mobile device will be associated with the exploitation of a vulnerability, the initiation of unwanted behavior or to facilitate a malicious attack, which may be represented as a predefined category (e.g., high, medium or low) or as a numerical value. More specifically, based on at one or more of (1) the risk level of one or more applications, (2) usage information of one or more applications, (3) the configuration of the mobile device, (4) the risk level of the network traffic, and/or other factors, the threat level determination logic 212 generates a value that identifies the threat level of a mobile device.

The weighting logic 181 may be configured to apply weighting to results of processing provided by the analysis cloud 120 and the analysis server 114 as well as usage information and configuration information provided by the mobile agent 131A. Thereafter, the classification logic 210 may route classification results comprising the weighting and/or prioritization to the alert generation logic 220. The classification results may include the details of one or more applications denoted in the application data, classification of any behaviors detected into categories (e.g., malware, vulnerabilities, code obfuscation, etc.), and/or describe the behaviors and/or threats posed and the threat level of the mobile device.

The alert generation logic 220 is adapted to receive information from the classification logic 210 and generate alerts that identify to a user of an endpoint device, network administrator or an expert network analyst the threat level of a device as well as the risk levels of each application installed on that mobile device. The alerts may include various types of messages, which may include text messages and/or email messages, video or audio stream, or other types of information over a wired or wireless communication path.

As shown FIG. 2B, the communication interface 250 of the analysis server 114 receives transmissions from the the management server 113. The virtual machine monitor (VMM) 270 manages the processing of one or more executables in one or more of $VM\_1_1$-$VM\_1_j$. The instance of the mobile webview emulator is launched during dynamic processing of one or more applications within a $VM\_1_1$-$VM\_1_j$ such that the network traffic generated by the applications running therein may be analyzed. As discussed above, the mobile webview emulator 271 and the VMM 270 may monitor the network traffic generated by the applications running therein and record any anomalous or unwanted traffic or behavior as well as any malicious traffic or activity. Policies for detecting the above may be stored within the storage device 280.

The classification logic 260 may be configured to receive the dynamic analysis results (which may also be stored in the storage device 280). According to one embodiment of the disclosure, the classification logic 260 comprises the weighting logic 262 and the risk level determination logic 261. The risk level determination logic 261 is configured to determine a probability (or level of confidence) that the generated network traffic will be used in the exploitation of a vulnerability, the initiation of unwanted behavior to facilitate a malicious attack, or is malicious, anomalous or unwanted traffic, which may be represented as a predefined category (e.g., high, medium or low) or as a numerical value. More specifically, based on the detection of particular behaviors of the application, particular characteristics of the received traffic, or traffic generated from one or more applications running within the VM during the dynamic analysis, the risk level determination logic 261 generates a value that may be used, in part, to identify the risk level of the network traffic which is attributed to the mobile device under analysis. Rules for detecting particular behaviors and characteristics may be stored in the storage device 280. Thereafter, the classification logic 260 may route the determined risk level to the management server 113 for inclusion in the determination of the threat level of the mobile device under analysis.

Figure 2C:
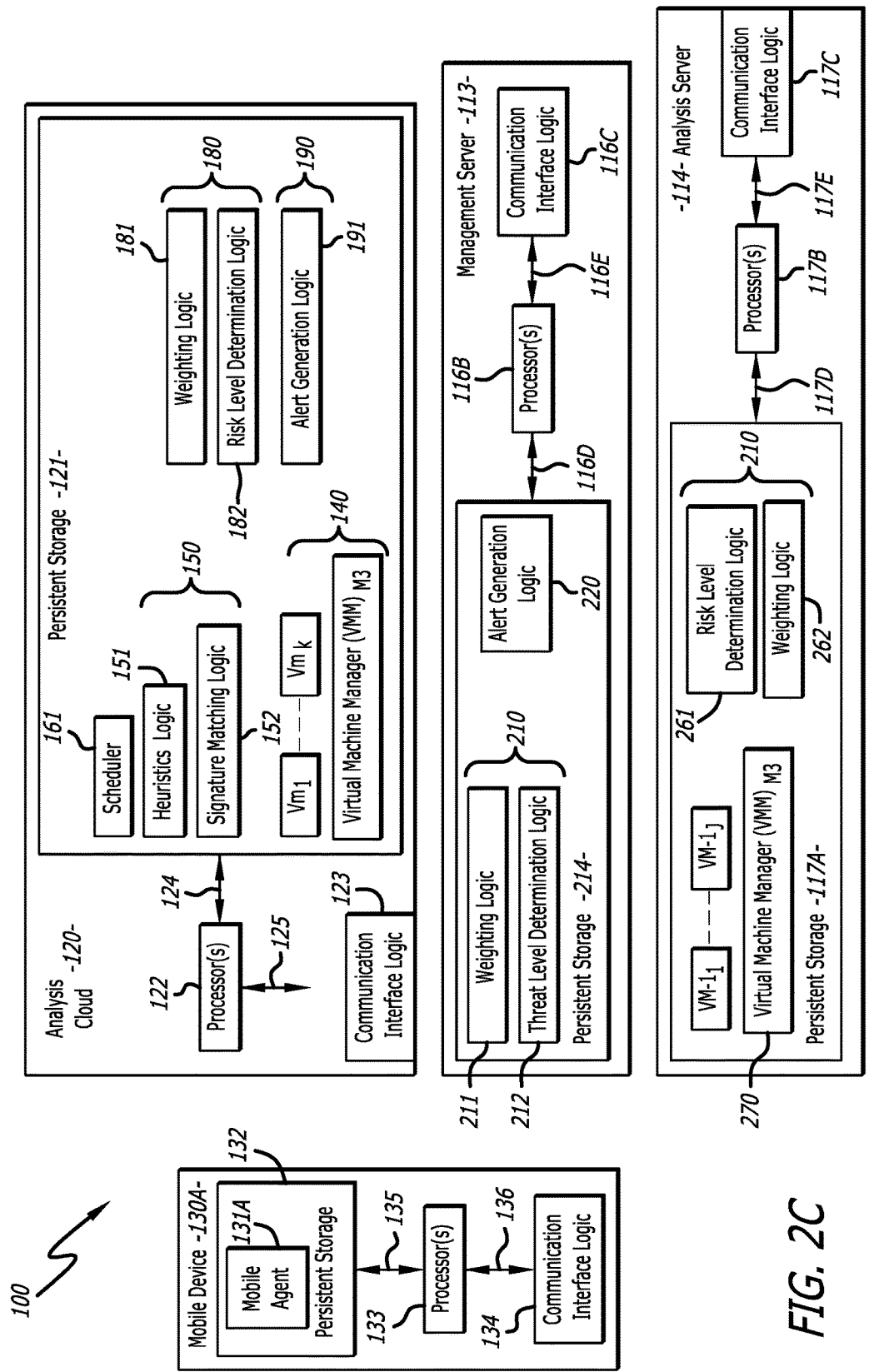
FIG. 2C is an exemplary embodiment of a logical representation of the mobile application risk analysis system 100.

Referring to FIG. 2C and in combination with FIGS. 1A-1B, an exemplary embodiment of a logical representation of the mobile application RAS 100 is shown. Herein, four components are illustrated: the mobile device 130A, the analysis cloud 120, the management server 113 and the analysis server 114. The mobile device 130A includes one or more processors 133 that are coupled to a communication interface logic 134 via a first transmission medium 136. The communication interface logic 134 enables communications with the network 110 and the Internet. According to one embodiment of the disclosure, communication interface logic 134 may be implemented as a physical interface including one or more ports for wired connectors. Additionally, or in the alternative, communication interface logic 134 may be implemented with one or more radio units for supporting wireless communications with other electronic devices. Processor(s) 133 is further coupled to persistent storage 132 via transmission medium 135. According to one embodiment of the disclosure, persistent storage 132 may include a mobile agent 131A.

The analysis cloud 120 includes one or more processors 122 that are coupled to a communication interface logic 123 via a first transmission medium 125. The communication interface logic 123 enables communications with the network 110 and the Internet. According to one embodiment of the disclosure, communication interface logic 123 may be implemented as a physical interface including one or more ports for wired connectors. Additionally, or in the alternative, communication interface logic 123 may be implemented with one or more radio units for supporting wireless communications with other electronic devices. Processor(s) 122 is further coupled to persistent storage 121 via transmission medium 124. According to one embodiment of the disclosure, persistent storage 121 may include a scheduler 161, a static analysis logic 150 including heuristics logic 151 and signature matching logic 152, a dynamic analysis logic 140 including $VM_1$-$VM_K$ and a virtual machine manager (VMM) 270, a classification logic 180 including a weighting logic 181 and a risk level determination logic 182, and a reporting logic 190 including an alert generation logic 191. Of course, when implemented as hardware, one or more of these logic units could be implemented separately from each other.

The management server 113 includes one or more processors 116B that are coupled to a communication interface logic 116C via a first transmission medium 116E. The communication interface logic 116C enables communications with the network 110 and the Internet. According to one embodiment of the disclosure, communication interface logic 116C may be implemented as a physical interface including one or more ports for wired connectors. Additionally, or in the alternative, communication interface logic 116C may be implemented with one or more radio units for supporting wireless communications with other electronic devices. Processor(s) 116B is further coupled to persistent storage 116A via transmission medium 116D. According to one embodiment of the disclosure, persistent storage 116A may include a classification logic 210 including a weighting logic 211 and a threat level determination logic 212, and an alert generation logic 220. Of course, when implemented as hardware, one or more of these logic units could be implemented separately from each other.

The analysis server 114 includes one or more processors 117B that are coupled to a communication interface logic 117C via a first transmission medium 117E. The communication interface logic 117C enables communications with the network 110 and the Internet. According to one embodiment of the disclosure, communication interface logic 117C may be implemented as a physical interface including one or more ports for wired connectors. Additionally, or in the alternative, communication interface logic 117C may be implemented with one or more radio units for supporting wireless communications with other electronic devices. Processor(s) 117B is further coupled to persistent storage 117A via transmission medium 117D. According to one embodiment of the disclosure, persistent storage 117A may include a classification logic 260 including a weighting logic 261 and a risk level determination logic 262, $VM\_1_1$-$VM\_1_j$ and a virtual machine manager (VMM) 270. Of course, when implemented as hardware, one or more of these logic units could be implemented separately from each other.

Figure 3:
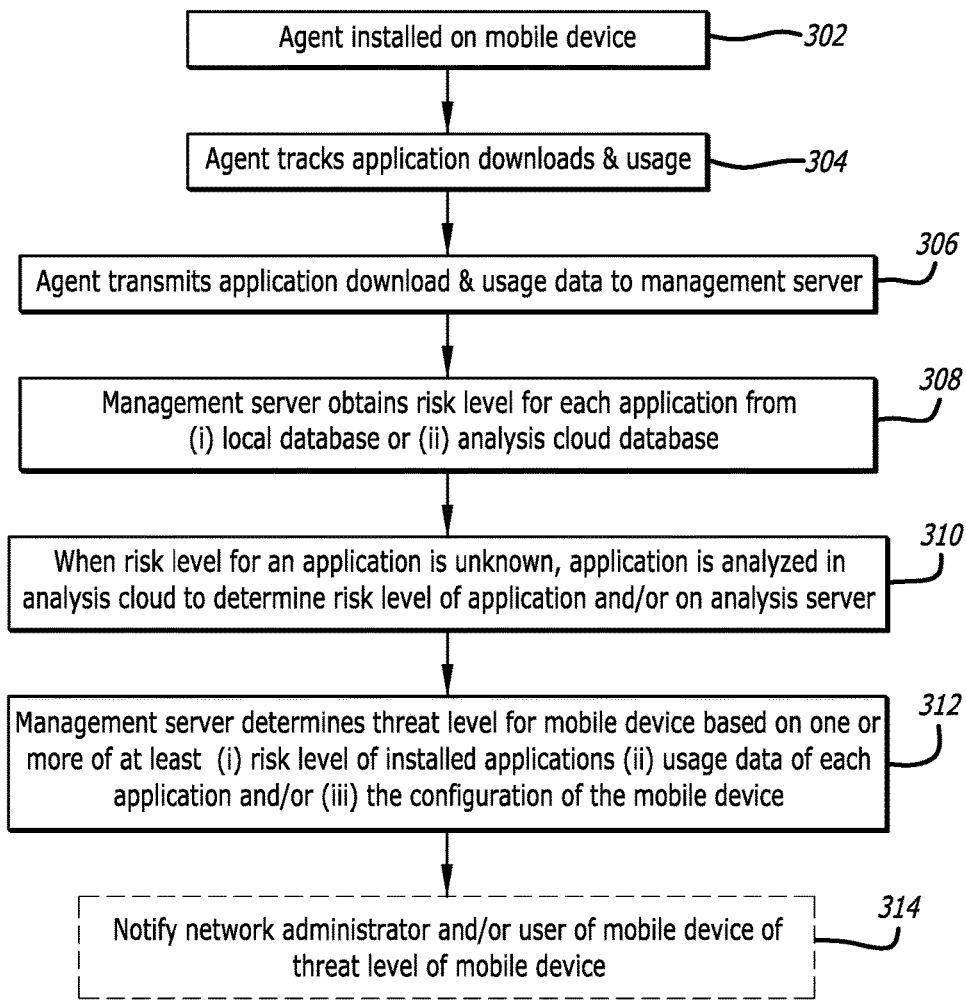
FIG. 3 is a flowchart illustrating an exemplary method for determining a threat level of a mobile device with the mobile application RAS 100 of FIGS. 1A-1B or 2A-2B.

Referring now to FIG. 3, and in combination with FIGS. 1A-1B and 2A-2B, a flowchart illustrating an exemplary method for determining a threat level of a mobile device with the mobile application RAS 100 of FIGS. 1A-1B is shown. Each block illustrated in FIG. 3 represents an operation performed in the method 300 of determining a threat level of a mobile device connected to the network 110. At block 302, a mobile agent is installed on a mobile device and runs in the background. At block 304, while running in the background, the mobile agent tracks application usage on the mobile device and determines when an application has been installed.

As discussed above, via a push-operation performed by the mobile agent to the management server 113 or a pull-operation performed by the management server 113, the mobile agent transmits the application data (block 306).

At block 308, the management server 113 obtains a risk level for each of the applications installed on the mobile device. As discussed above, the management server 113 may query the local database 230 such that the hash values, or other derivative representations, transmitted by the mobile agent are compared to the hash values, or other derivative representations, stored in the local database 230. Alternatively, if an identifier for each of the applications is provided, the identifier may be compared to identifiers stored in the local database 230. When a match is found, the risk level for the application corresponding to the hash value, the identifier or other derivative representation is obtained by the management server 113. In one instance, the management server 113 may not contain a match to one or more of the hash values, identifiers or other derivative representation. In such an instance, the management server 113 queries a database associated with the analysis cloud 120 (e.g., the mobile application risk level database 170) and a similar comparison is performed as with the local database 230. In one embodiment, the management server 113 may not include a local database. In such an embodiment, the management server 113 queries the database associated with the analysis cloud 120.

At block 310, when a risk level of an application installed on the mobile device is unknown by the mobile application RAS 100 ("unknown application"), the application is analyzed by the analysis cloud 120. As discussed above, the analysis cloud 120 may perform a static analysis and/or a dynamic analysis on the unknown application upon obtaining a copy of the executable of the unknown application. After performing a static analysis and/or a dynamic analysis on the executable of the unknown application, the analysis cloud 120 determines a risk level of the unknown application, stores the risk level in the mobile application risk level database 170 and transmits the risk level to the management server 113.

At block 312, upon obtaining a risk level for each of the applications installed on the mobile device, the management server 113 determines the threat level of the mobile device based on one or more of: (1) the risk level of one or more applications, (2) usage information of one or more applications, (3) the configuration of the mobile device, (4) the risk level of the network traffic, and/or other factors. In one embodiment, one or more applications may be weighted differently such that the risk level of a first application is given more weight than the risk level of a second application in the determination of the threat level of the mobile device. For example, the weighting of one or more applications may be predetermined and stored in a database on the management server 113 or may be based on the usage information (e.g., an application that is never used may be given a low weight while an application that is used on a daily basis may be given a higher weight).

At optional block 314, a notification may be generated by the management server 113 (or the analysis server 120) to notify the user of the mobile device and/or a network administrator of the risk level of one or more applications and/or the threat level of the mobile device.

Figure 4A:
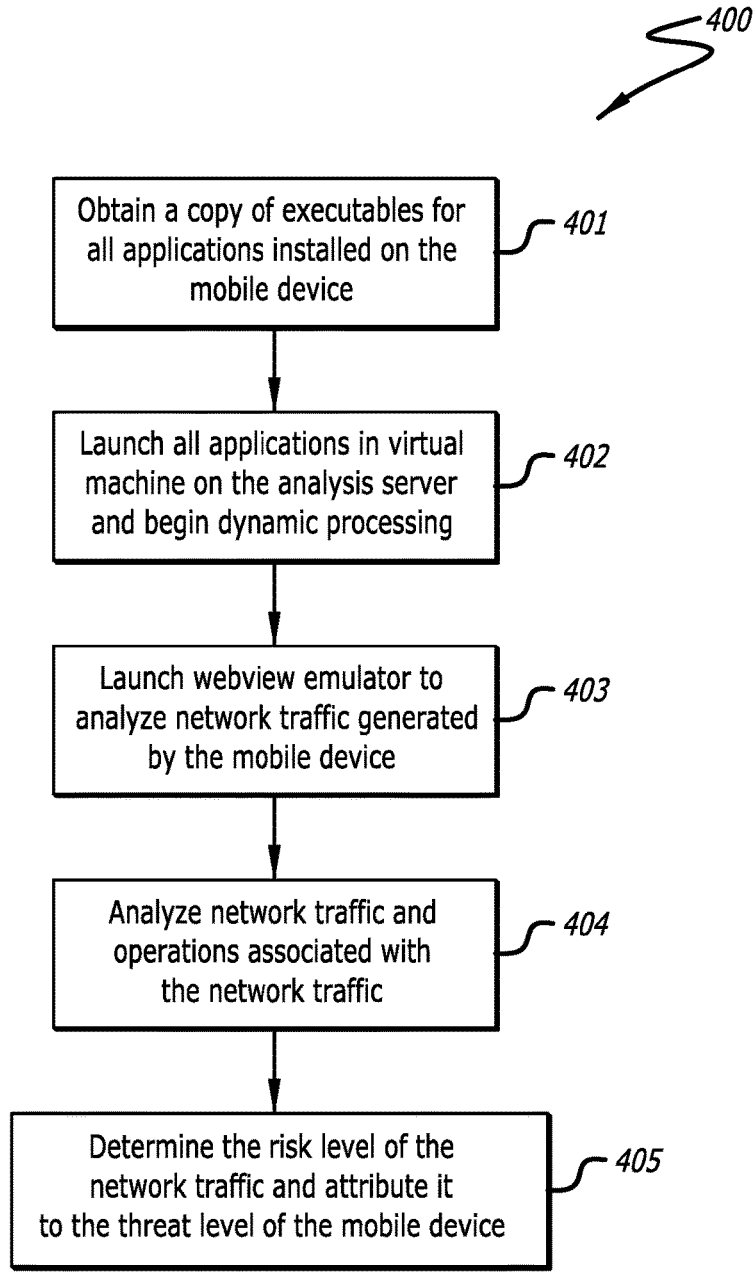
FIG. 4A is a flowchart illustrating an exemplary method for determining a threat level of a mobile device.
Figure 4B:
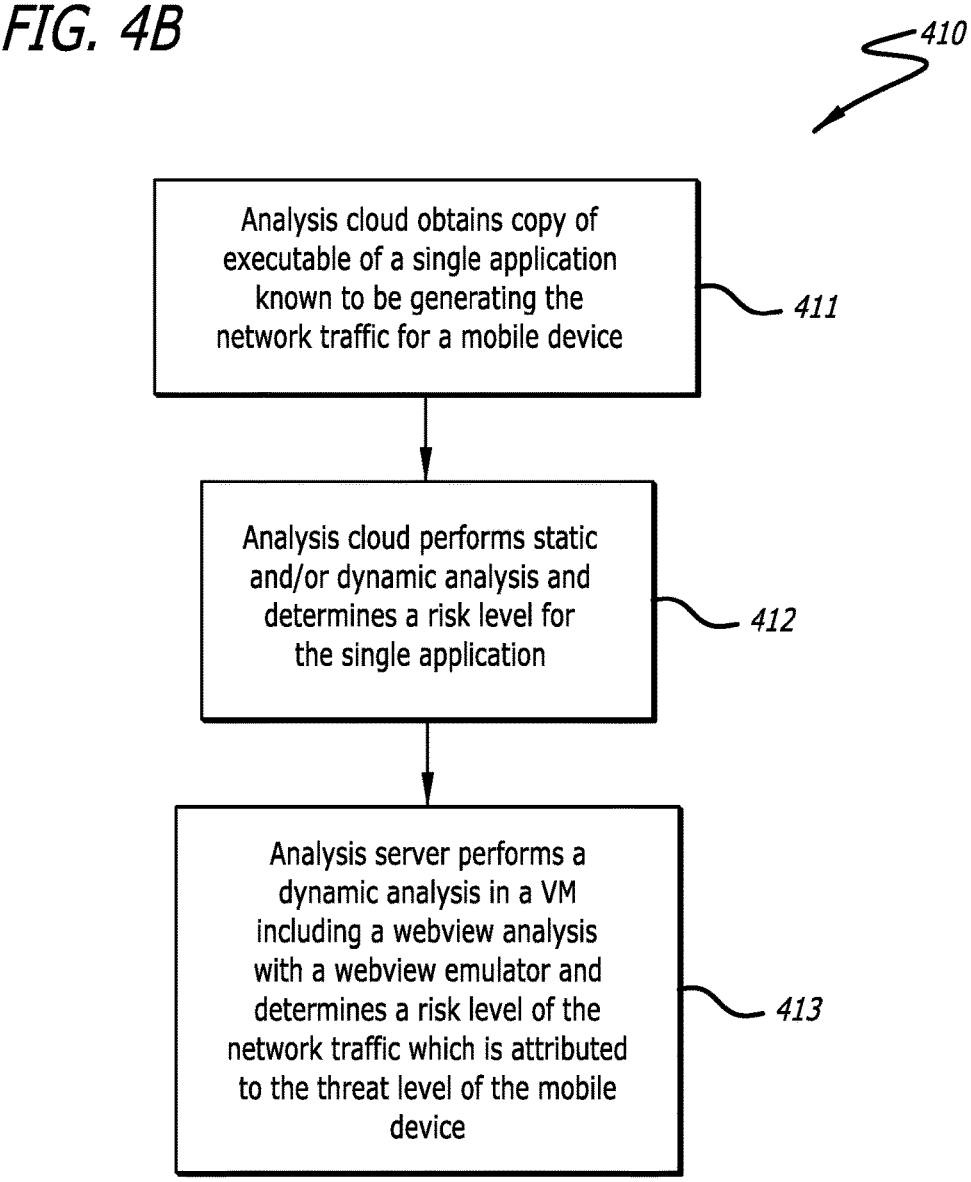
FIG. 4B is a flowchart illustrating an exemplary method for determining a risk level of an application and a risk level of network traffic.

Referring to FIGS. 4A and 4B, and in combination with FIGS. 1A-1B and 2A-2B, flowcharts illustrating embodiments of methods for determining a risk level of an application. Referring now to FIG. 4A, a flowchart illustrating an exemplary method for determining a threat level of a mobile device is shown. Each block illustrated in FIG. 4A represents an operation performed in the method 400 of determining a threat level of a mobile device through processing in the analysis server 114. At block 401, the analysis server obtains a copy of the executables for each of the applications installed on the mobile device under analysis. At block 402, the applications are launched in a virtual machine within the analysis server 114 and dynamic processing begins therein. In one embodiment, the analysis server 114 queries the management server 113 for a copy of the executable. The management server 113 subsequently queries the mobile agent installed on the mobile device for a copy of the executable.

At block 403, a webview emulator is launched within the VM in order to analyze the network generated by the mobile device under analysis. For example, the mobile webview emulator will emulate an embedded web browser of the mobile device and monitor the traffic generated by one or more of the applications running in the VM.

In some instances, the number of applications running on a mobile device make it difficult to determine which single application is responsible for generating the network traffic. Therefore, the risk level of the network traffic is attributed to the mobile device as opposed to a single application. As used herein, "network traffic" may be construed as data passed between the mobile device and either the network 110 or the Internet.

At block 404, the network traffic is analyzed, and optionally operations associated with the network traffic, by the risk level determination logic 261 and at block 405, the risk level determination logic 261 determines a risk level of the network traffic. This risk level is then attributed to the mobile device, as explained above.

Referring now to FIG. 4B, a flowchart illustrating an exemplary method for determining a risk level of an application and a risk level of network traffic is shown. Each block illustrated in FIG. 4B represents an operation performed in the method 410 of determining a risk level of an application in the analysis cloud 120 and a risk level of network traffic in the analysis server 114. At block 411, the analysis cloud obtains a copy of the executable of a single application known to be generating the network traffic for the mobile device under analysis. In one embodiment, the analysis cloud 120 contacts a distribution organization of the application (typically referred to as an application store, such as Apple's App Store® and Google Play™). In a second embodiment, the analysis cloud 120 queries the management server 113 for a copy of the executable. The management server 113 subsequently queries the mobile agent installed on a mobile device on which the application is installed for a copy of the executable.

At block 412, the analysis cloud 120 performs a static analysis and/or a dynamic analysis on the single application and determines a risk level for the single application. In one embodiment, the dynamic processing of the dynamic analysis logic 140 and the static processing of the static analysis logic 150 are iterative processes such that static processing may begin when the dynamic processing ends and focus the static analysis according to results of the dynamic analysis. In such an embodiment, dynamic processing may begin when the static processing ends and the VM may be configured based on the results of the static processing. The iterative process may end after a predefined amount of time has expired or when the processing has uncovered enough information to determine a risk level for the application.

At block 413, the analysis server 114 performs a dynamic analysis in a VM. Specifically, the dynamic analysis includes a webview analysis of the network traffic generated by the single application. The a copy of the executable is obtained, as discussed above, and the single application is launched within the VM. The mobile webview emulator 271 monitors the traffic generated by the single application. In other embodiments, this process may be used with more than one application and as discussed above, the risk level of the network traffic is typically done following a dynamic analysis of all of the applications installed on the mobile device. Finally, upon completion of the dynamic processing in the VM, the risk level determination logic 212 may determine a risk level of the network traffic. Although not shown, as is discussed above, the risk level is then provided to the management server 113.

Additionally, although not illustrated, the management server 113 subsequently determines a threat level for the mobile device based on, at least, (1) risk level of the web traffic of the mobile devices, (2) the risk level of one or more applications, (3) usage information of one or more applications, and/or (4) the configuration of the mobile device.

III. Graphical User Interfaces of the Mobile Application RAS

As was mentioned above, one or more of the management server, the mobile agents and/or the analysis cloud may generate a graphical user interface (GUI) in order to present data associated with the risk level of one or more applications and/or the threat level of one or more mobile devices connected to the network to a network administrator and/or a user of a mobile device. The GUIs are presented to a user of a mobile device through a display screen of the mobile device. The presentation of the information tracked and gathered by a mobile agent, the information derived during analysis of an application, the risk level of an application and the threat level of a device may aid a user and/or network administrator in increasing the security of the network such that information (e.g., sensitive corporate information) accessible via the network is not compromised, information on a mobile device is not compromised and the operation of the network is not compromised.

Specifically, in one embodiment, a user may utilize a GUI presenting the threat level of the user's mobile device and the risk level of each application installed thereon to determine whether one or more applications are safe to have installed while connecting the mobile device to the network.

Additionally, a network administrator may review detailed information pertaining to one or more applications and set policies associated with applications at a higher granularity than would otherwise be possible. For example, a network administrator may review results of a static analysis and/or a dynamic analysis (in the analysis cloud and/or the analysis server) and determine that a particular behavior is associated with a plurality of applications that are known to include a particular vulnerability, used to facilitate a particular malicious attack or unwanted behavior. Based on this determination, the network administrator may set a policy, for example, blacklisting the behavior, such that the risk level of one or more applications may be altered upon a future next analysis. This may in turn alter the threat level of one or more mobile devices connected to the network. Therefore, in such an instance, the analysis of detailed information from static and/or dynamic analysis by a network administrator may result in a change in the risk level of some applications and therefore alter the number of number of devices having a "low threat level," a "medium threat level," and/or a "high threat level." Similarly, if a numerical representation of a threat level is used, the numerical representations may change as well.

As is shown in FIGS. 5-16 and discussed below, the GUIs generated by one or more of the management server, the mobile agents and/or the analysis cloud present detailed information that enables a user and/or a network administrator to determine the percentage of mobile devices categorized at different threat levels and set policies for mobile devices and applications accordingly. The detailed, actionable and reliable information presented to a user and/or a network administrator enables decisions regarding the installation of applications and permissions to connect to the network at a higher level of granularity than would otherwise be possible.

A. Management Server Generated GUI

Figure 5:
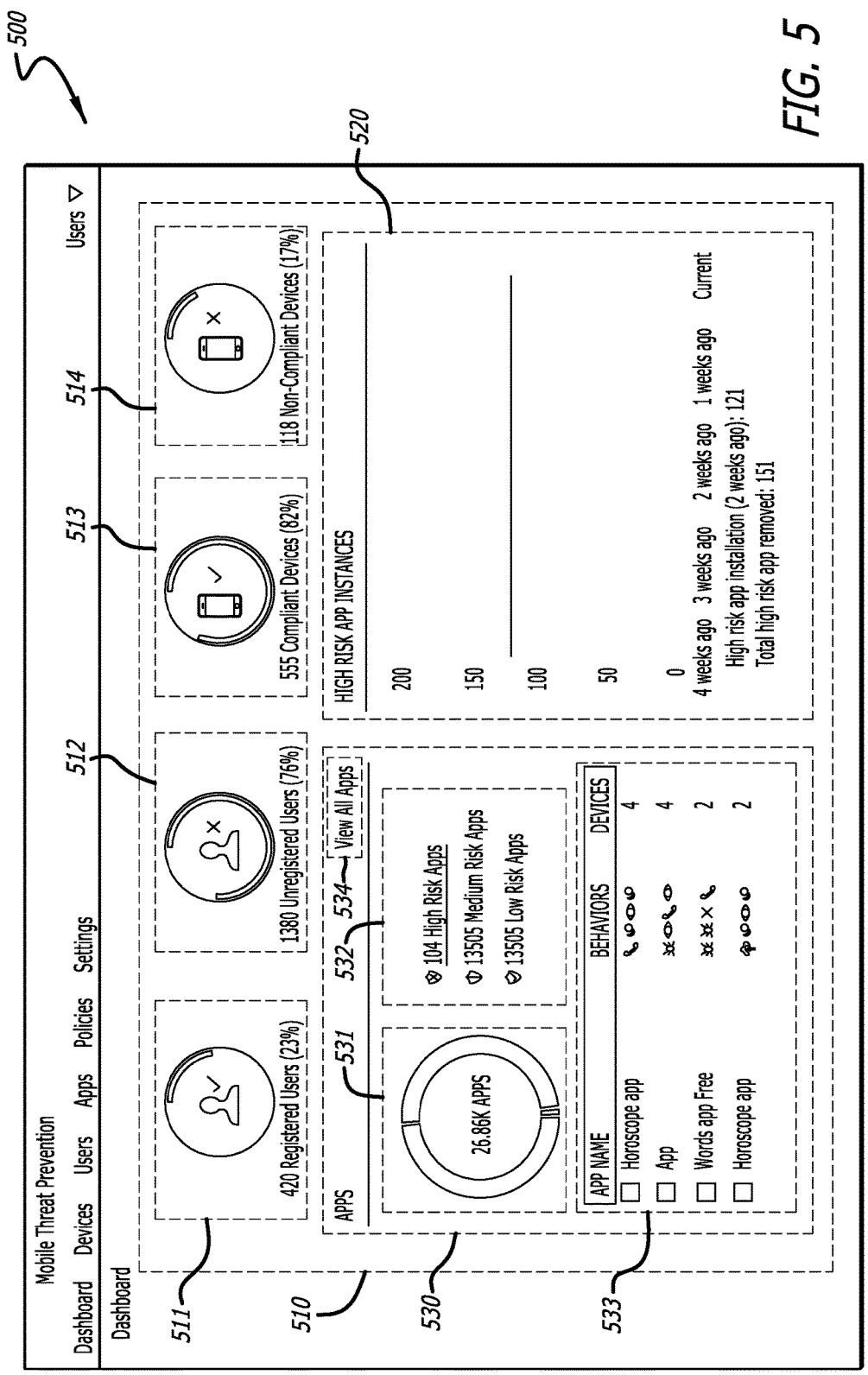
FIG. 5 is an exemplary embodiment of a mobile application risk analysis system screen that illustrates an overview of the risk presented to the network 110 from the mobile devices connected to the network 110.

Referring now to FIG. 5, and in combination with FIGS. 1A-1B and 2A-2B, an exemplary embodiment of a mobile application risk analysis system screen 500 that illustrates an overview of the risks presented to the security of, inter alia, sensitive information accessible via the network 110 from the mobile devices connected to the network 110 is shown. The display screen 500 may be accessed by selecting the "Dashboard" tab as seen in FIGS. 5-10. Herein, rendered by the management server 113, the screen 500 illustrates an overview of the risk presented to the network 110 from the mobile devices connected thereon, where the overview constitutes a "Dashboard." As will be illustrated in FIGS. 5-10, the screen 500 includes a header with five tabs: Dashboard, Devices, Users, Apps, Policies and Settings. Of course, more or fewer options may be present. Each of the five tabs will be illustrated below.

The screen 500 includes a display area 510 comprising display rings 511-514, a high risk graphical display area 520 and an application display area 530. A first display ring 511 presents an illustrative view of the percentage of users connected to the network 110 (via a mobile device) that are registered users. Herein, the illustrative view includes a circle including a progress bar representing the percentage of registered users compared to the number of total users. As one skilled in the art would recognize, alternative shapes may be used. Similar to the first display ring 511, a second display ring 512 illustrates the percentage of unregistered users connected to the network 110 via a mobile device. A third display ring 513 illustrates the percentage of compliant devices connected to the network 110 while a fourth display ring 514 illustrates the percentage of non-compliant devices connected to the network 110. Herein, a mobile device may be deemed compliant when the mobile device satisfies a predetermined percentage of requirements set forth by a network administrator (e.g., a mobile device may be compliant if it does not include any high risk applications and/or fewer than a predetermined number of medium risk applications) and/or policies, to be discussed below.

The application display area 530 includes a display area 531 that illustrates the number of applications installed on mobile devices connected to the network 110. The application display area 530 further includes display areas 532 and 533. The display area 532 lists a breakdown of the applications installed on mobile devices on the network 110 into three categories: (1) high risk, (2) medium risk, and (3) low risk. The display area 533 presents a graphical timeline illustration of the number of high risk application instances over a given timeframe (e.g., the past four weeks at weekly intervals).

Figure 6:
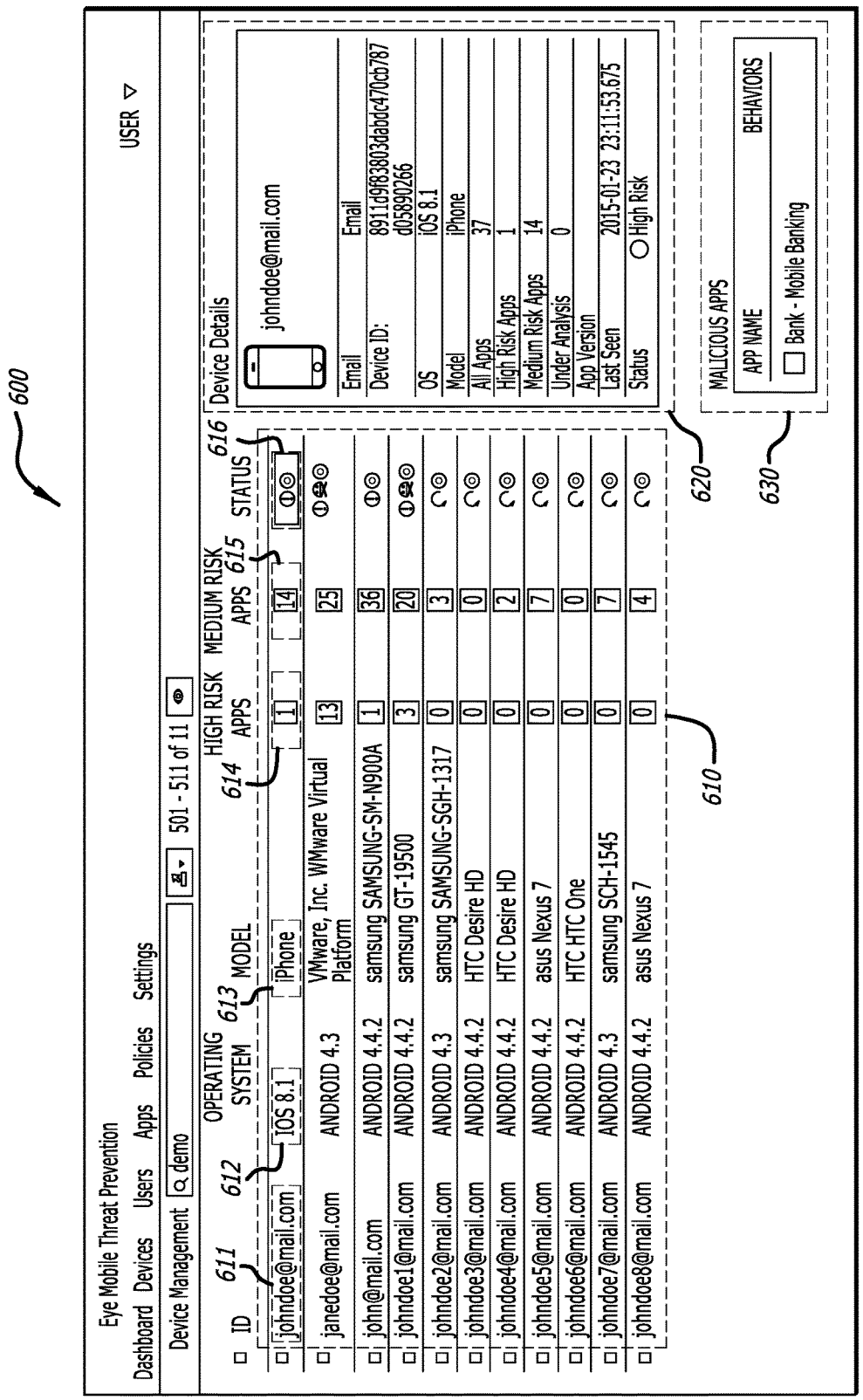
FIG. 6 is an exemplary embodiment of a mobile application risk analysis system screen that illustrates an overview of the mobile devices connected to the network 110

Referring to FIG. 6, and in combination with FIGS. 1A-1B and 2A-2B, an exemplary embodiment of a mobile application risk analysis system screen 600 that illustrates an overview of the mobile devices connected to the network 110 is shown. The display screen 600 may be accessed by selecting the "Devices" tab as seen in FIGS. 5-10. Herein, rendered by the management server 113, the display screen 600 includes display areas 610, 620 and 630. The display area 610 illustrates the devices connected to the network 110 and information associated with each device. The display area 610 includes several columns including: identification (ID), operating system, model, high risk applications, medium risk applications, and status. For example, the first row includes item 611 representing an identification of a first mobile device and/or the user of the first mobile device (e.g., an email address), item 612 representing the operating system of the first mobile device (e.g., Apple iOS 8.1), item 613 representing the model of the first mobile device (e.g., an Apple iPhone), item 614 representing the number of high risk applications installed on the first mobile device, item 615 representing the number of medium risk applications installed on the first mobile device, and item 616 representing the status of the first mobile device (e.g., high threat level, medium threat level, rooted/jailbroken, currently undergoing scanning, etc.).

The display area 620 presents details for the selected device. For example, in the display screen 600, the first mobile device is selected and details for the first mobile device are listed including, but not limited or restricted to, the email registered to the mobile device and/or the user thereof, the device ID, the operating system of the first mobile device, the model, the total of applications installed on the device, etc.

The display area 630 presents details of the malicious application(s) (e.g., high risk applications) installed on the selected device. Herein, the first mobile device includes one high risk application, which may be, for example, a mobile banking application.

Referring to FIG. 7, and in combination with FIGS. 1A-1B and 2A-2B, an exemplary embodiment of a mobile application risk analysis system screen 700 that illustrates an overview of the users connected to the network 110 via a mobile device is shown. The display screen 700 may be accessed by selecting the "Users" tab as seen in FIGS. 5-10. Herein, rendered by the management server 113, the display screen 700 includes the display areas 710 and 720. The display area 710 lists the users connected to the network 110 and information of each user. The display area 710 includes several columns including: name, email, department, role, status, and number of devices. For example, the first row includes item 711 representing the name of a first user (e.g., last name, first name), item 712 representing the email address of the first user (e.g., msm@email.com), item 713 representing the department of the first user (e.g., Marketing), item 714 representing the role of the user in the company (e.g., security administration), item 715 representing whether the user is registered with the network 110 and item 716 representing the number of mobile device the user has connected to the network 110.

The display area 720 presents additional details of the selected user including, but not limited or restricted to, the user's picture, first name, last name, email address, role, status, and number of devices.

Referring to FIG. 8, and in combination with FIGS. 1A-1B and 2A-2B, an exemplary embodiment of a mobile application risk analysis system screen 800 that illustrates an overview of the applications installed on mobile devices connected to the network 110 is shown. The display screen 800 may be accessed by selecting the "Apps" tab as seen in FIGS. 5-10. Herein rendered by the management server 113, the display screen 800 includes the display areas 810-830. The display area 810 includes several columns including: application name, package name, publisher, devices, operating system, version, threat level and policy. For example, the first row includes item 811 representing a name of a first application (e.g., PGA Tour), item 812 representing the package name of the first application (e.g., com.pgatour.ipad), item 813 representing the publisher of the first application (e.g., PGATour.com LLC), item 814 representing the number of devices on which the first application is installed, item 815 representing the operating system for which the first application is designed (e.g., iOS 8.3), item 816 representing the version of the first application, item 817 representing the risk level of the first application (e.g., high, medium or low) and item 818 representing the policy associated with the first application.

The display area 820 presents additional details of the selected application including, but not limited or restricted to, the threat level, the policy associated with the first application, the package name of the first application, a MD5 hash value of the executable of the first application, a SHA1 hash value of the executable of the first application, etc.

Figure 9:
FIG. 9 is an exemplary embodiment of a mobile application risk analysis system screen that illustrates an overview of the policies set forth for the network 110.

Referring to FIG. 9, and in combination with FIGS. 1A-1B and 2A-2B, an exemplary embodiment of a mobile application risk analysis system screen 900 that illustrates an overview of the policies set forth for the network 110 is shown. The display screen 900 may be accessed by selecting the "Policies" tab as seen in FIGS. 5-10. Herein, rendered by the management server 113, the display screen 900 includes the display areas 910-960. The display area 910 includes lists the threats presented to the network 110 and policies associated with each threat. The display area 910 includes the following columns: threat, severity level, platform, and blacklisted. The threats are broken down according to the type of threat. Examples of threats include, but are not limited or restricted to, malware (e.g., display area 920), vulnerabilities (e.g., display area 930), application code (e.g., display area 940) and system/shell (e.g., display area 950). As an example, threats construed as "malware" may be found under the "exploits" portion and have a severity level of "high" (e.g., represented by a darkened/bold shield). Additionally, "malware" may be present on the Apple iOS platform and the Android platform. Furthermore, the display area 910 may show that there are currently no malware threats that are blacklisted (e.g., the policy associated with the threat).

The display area 960 includes detailed information of a selected threat. For example, the display area 960 may provide additional information of the Heartbleed attack as it pertains to OpenSSL. The display area 960 may detail the actual danger presented to the network 110 and list any applications that include the particular threat (e.g., herein, all applications that include OpenSSL).

Figure 10:
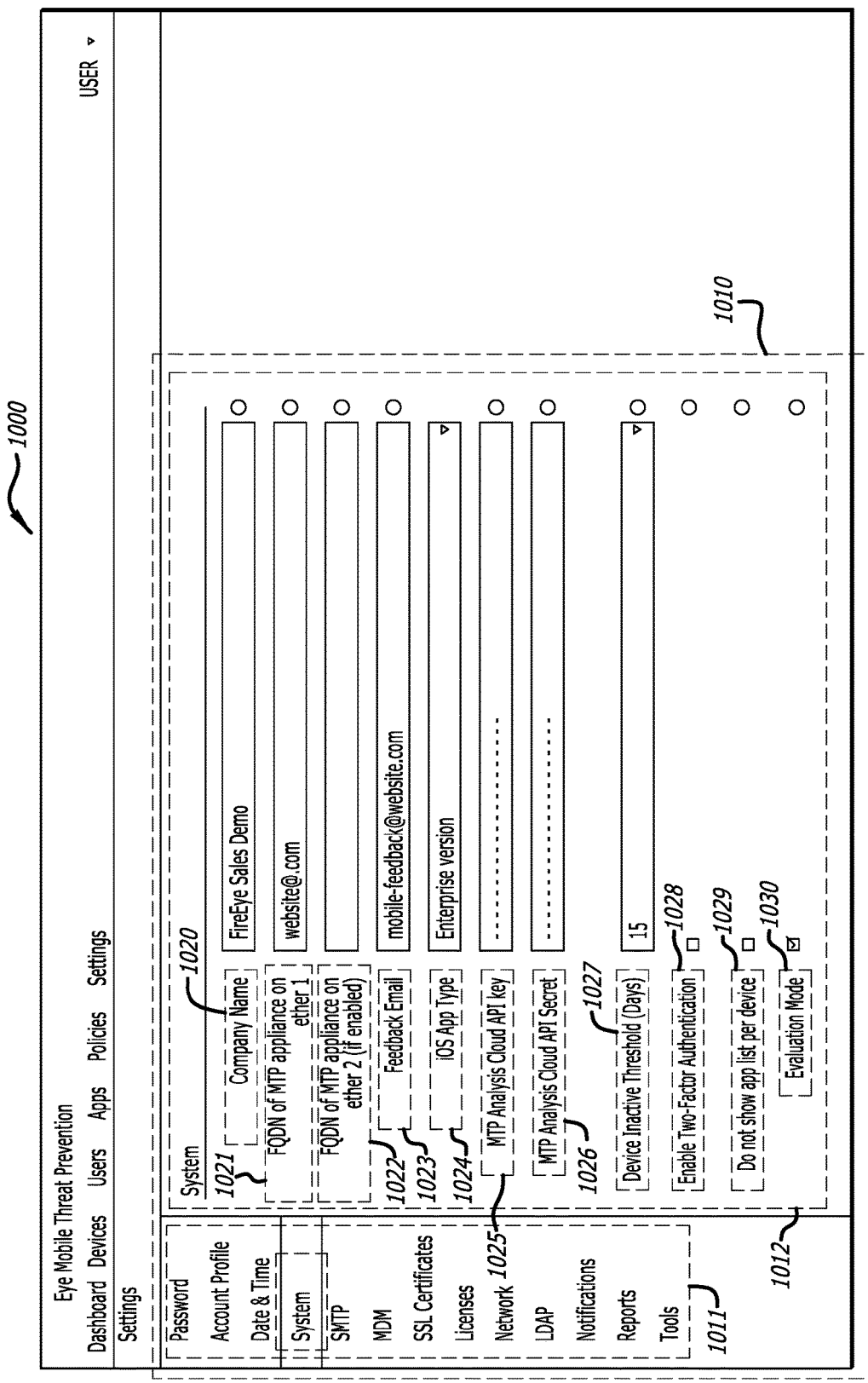
FIG. 10 is an exemplary embodiment of a mobile application risk analysis system screen that illustrates an overview of the settings selected for the network 110.

Referring to FIG. 10, and in combination with FIGS. 1A-1B and 2A-2B, an exemplary embodiment of a mobile application risk analysis system screen 1000 that illustrates an overview of the settings selected for the network 110 is shown. The display screen 1000 may be accessed by selecting the "Settings" tab as seen in FIGS. 5-10. Herein, rendered by the management server 113, the display screen 1000 includes the display area 1010, which includes the display sub-areas 1011 and 1012. The display area 1011 includes a plurality of selectable tabs including, but not limited or restricted to, password, account profile, date & time, system, etc. The display area 1012 includes a plurality of text boxes enabling a network administrator to set characteristics of the network 110 and/or the mobile application RAS 100 including, but not limited or restricted to, company name, feedback email, iOS App Type, etc.

B. Mobile Agent Generated GUI

Figure 11:
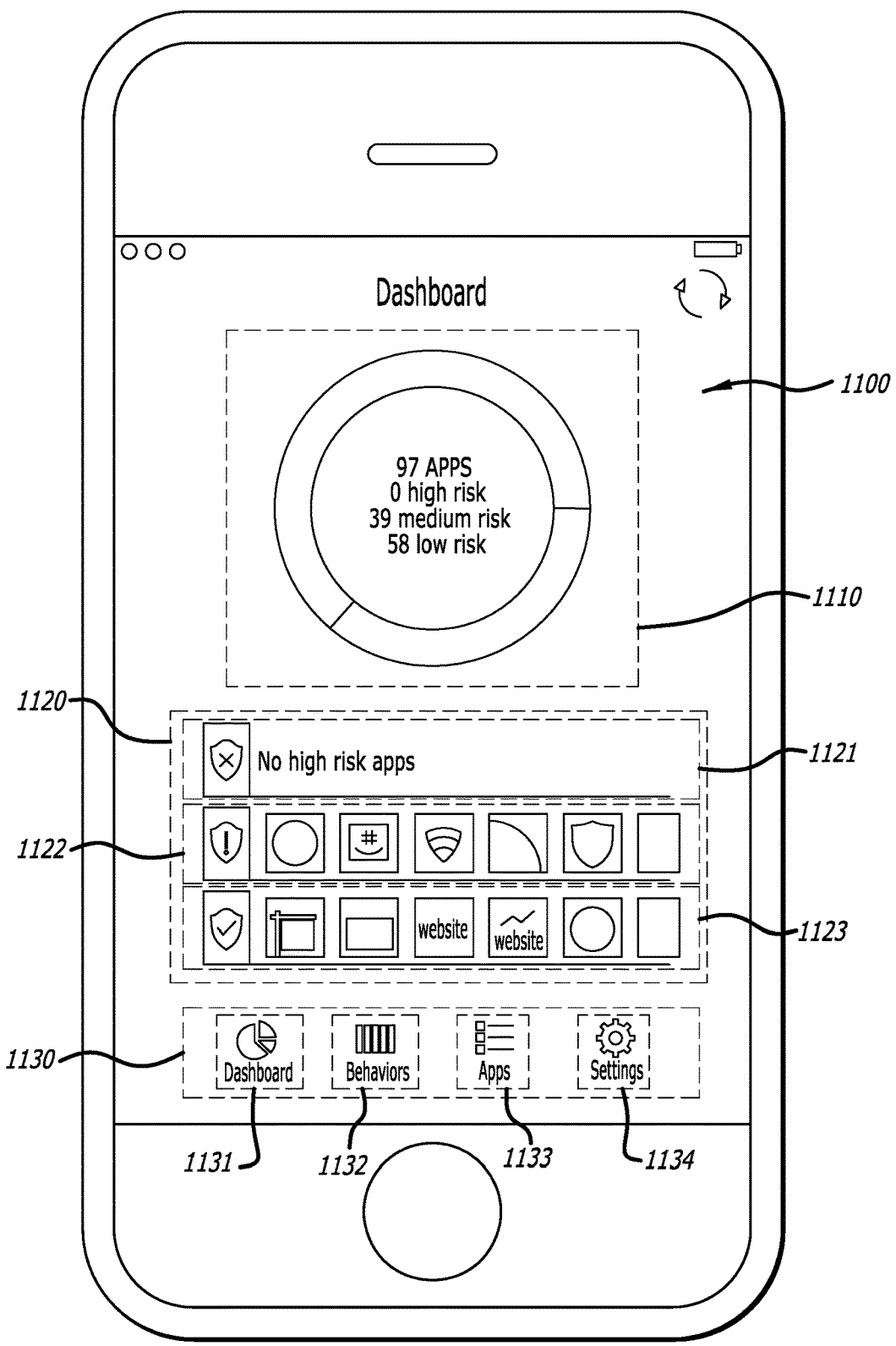
FIG. 11 is an exemplary embodiment of a mobile application risk analysis system screen that illustrates an overview of the policies set forth for the network 110 displayed on the screen of a mobile device.

Referring now to FIG. 11, and in combination with FIGS. 1A-1B and 2A-2B, an exemplary embodiment of a mobile application risk analysis system screen that illustrates an overview of the policies set forth for the network 110 displayed on the screen of a mobile device is shown. Herein rendered by a mobile agent, the display screen 1100 includes the display areas 1110-1130. The display area 1110 comprises a display ring that presents an illustrative view of the percentage of applications that are categorized as a high risk, a medium risk and a low risk. Herein, the illustrative view includes a circle including segments representing the percentage of the applications categorized in each risk level. As one skilled in the art would recognize, alternative shapes may be used.

The display area 1120 includes rows of icons including the rows 1121-1123. The icons in the row 1121 represent applications categorized as a high risk level. Similarly, the icons in the rows 1122 and 1123 represent applications categorized as a medium risk level and as a low risk level, respectively.

The display area 1130 includes icons 1131-1134, that enable a user of the mobile device quick access to the Dashboard display screen, the Behavior display screen, the Apps display screen, and the Settings display screen, respectively.

Figure 12:
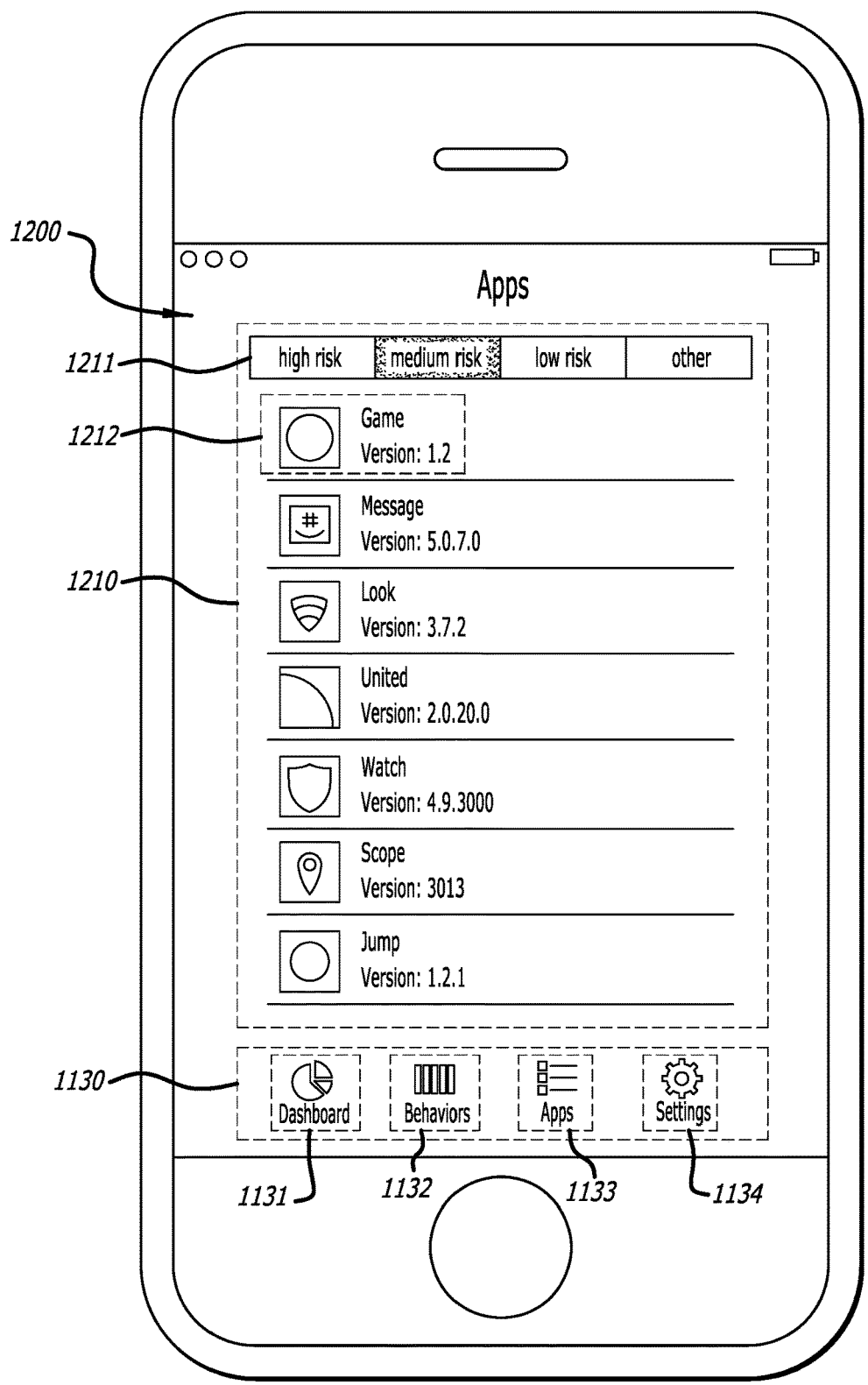
FIG. 12 is an exemplary embodiment of a mobile application risk analysis system screen that illustrates an overview of the applications installed on a mobile device.

Referring to FIG. 12, and in combination with FIGS. 1A-1B and 2A-2B, an exemplary embodiment of a mobile application risk analysis system screen that illustrates an overview of the applications installed on the mobile device is shown. Herein rendered by a mobile agent, the display screen 1200 includes the display areas 1210 and 1140. The display area 1210 comprises a illustrative listing of the applications installed on the mobile device. Specifically, the selection tab area 1211 includes a plurality of tabs including tabs divided upon risk level of each application. For example, as seen in FIG. 12, the high risk tab 1211 is selected such that the display area 1210 lists applications installed on the mobile device that have been categorized as having a high threat level. Each of a plurality of rows illustrate an application and details of the application. For example, the row 1212 includes an icon representing the mobile application "Game," which is in version 1.2.

As with FIG. 11, the display area 1130 of display screen 1200 includes icons 1131-1134, that enable a user of the mobile device quick access to the Dashboard display screen, the Behavior display screen, the Apps display screen, and the Settings display screen, respectively.

Figure 13:
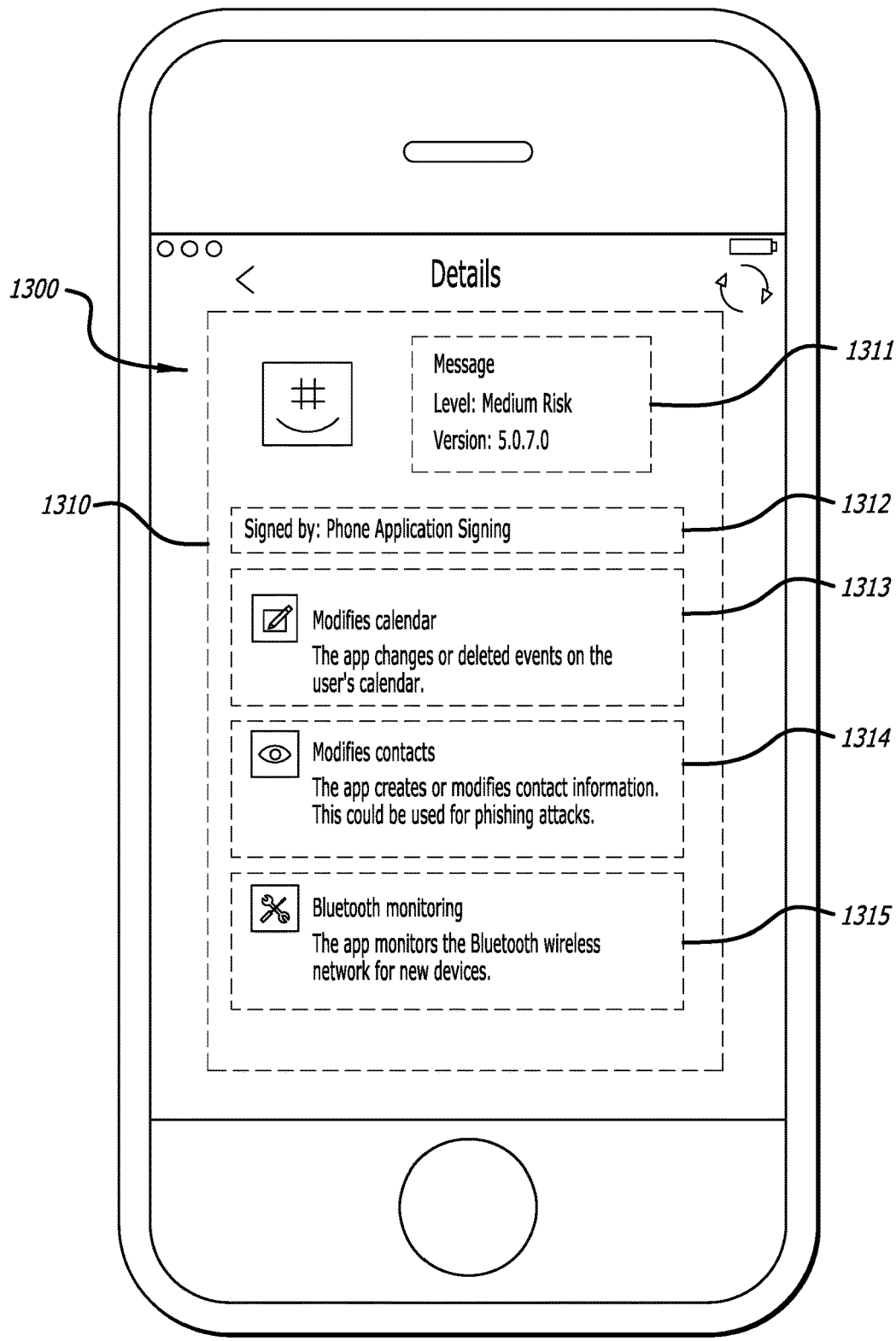
FIG. 13 is an exemplary embodiment of a mobile application risk analysis system screen that illustrates details of a selected application installed on the mobile device.

Referring to FIG. 13, and in combination with FIGS. 1A-1B and 2A-2B, an exemplary embodiment of a mobile application risk analysis system screen that illustrates details of a selected application installed on the mobile device is shown. Herein rendered by a mobile agent, the display screen 1300 includes display area 1310, which includes display areas 1311-1315. The display area 1310 includes an icon of the selection application and display area 1311 provides details of the application that include the name of the application, the risk level of the application and the version of the application. The display area 1312 includes information regarding the publisher or signer of the application. In one embodiment, information regarding the publisher or signer may be helpful in determining the risk level of application. For example, experiential knowledge may indicate that applications released by a particular publisher are routinely determined to have a high risk level. In such a situation, future applications released by that publisher may be flagged for extra analysis or may be categorized as having a high risk level by default prior to performing a dynamic processing on the application.

The display areas 1313-1315 provide information on certain behaviors of the application that caused the application to be categorized as it was (e.g., in FIG. 13, the application was categorized as having a medium risk level). The display areas 1313-1315 may include an icon associated with the behavior as well as text describing the behavior. Examples of behaviors include, but are not limited or restricted to, the modification of a calendar, the modification of contacts, or the monitoring of Bluetooth® activity.

Figure 14:
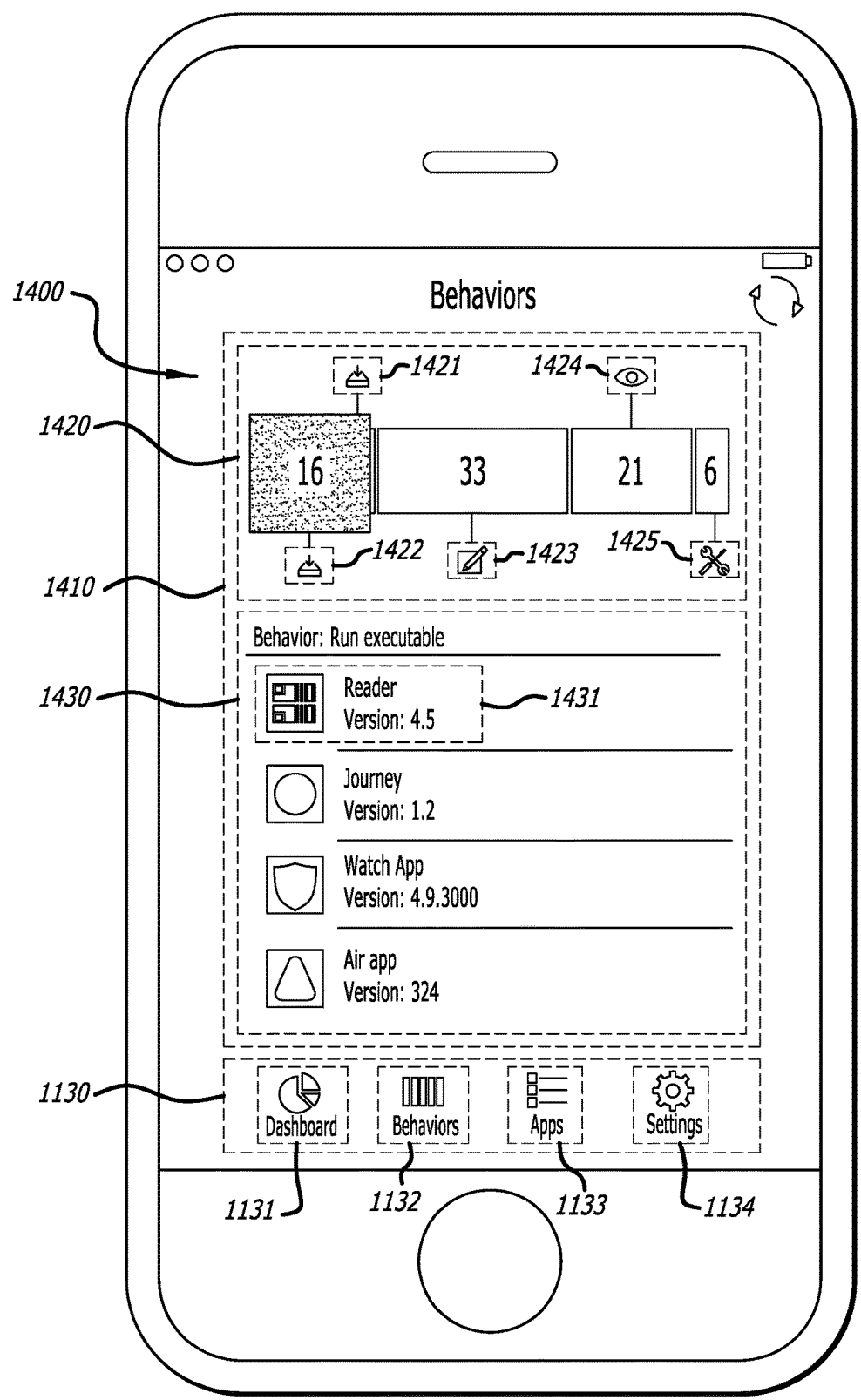
FIG. 14 is an exemplary embodiment of a mobile application risk analysis system screen that illustrates an overview of the behaviors performed by one or more applications installed on one or more applications connected to the network 110 displayed on the screen of a mobile device.

Referring to FIG. 14, and in combination with FIGS. 1A-1B and 2A-2B, an exemplary embodiment of a mobile application risk analysis system screen that illustrates an overview of the behaviors performed by one or more applications installed on one or more applications connected to the network 110 displayed on the screen of a mobile device is shown. Herein rendered by a mobile agent, the display screen 1400 includes the display areas 1410 and 1140.

The display area 1410 comprises the display area 1420 that presents an illustrative view of the number of applications that perform particular behaviors. For example, the behavior "Run executable" is selected and the display area 1420 illustrates that 16 applications installed on one or more mobile devices connected to the network 110 perform this behavior. The display area 1420 includes icons to indicate a behavior associated with a numbered box. For example, the display area 1420 includes icons 1421 and 1422 that correspond to the behavior "Run executable" and the box numbered 16, the icon 1423 that corresponds to the behavior "Modifies calendar" and the box numbered 33, the icon 1424 that corresponds to the behavior "Modifies contacts" and the box numbered 21, and the icon 1425 that corresponds to the behavior "Bluetooth monitoring" and the box numbered 6.

The display area 1410 also comprises the display area 1430, which provides additional information regarding the behavior selected in the display area 1420. In particular, the display area 1430 lists the applications that perform the selected behavior using an icon associated with each application, the name of the application and the version of the application. As one example, row 1431 illustrates that that version 4.5 of the application, "Reader" performs the selected behavior of "Run executable."

As is also seen in FIGS. 11 and 12, the display area 1130 includes icons 1131-1134, that enable a user of the mobile device quick access to the Dashboard display screen, the Behavior display screen, the Apps display screen, and the Settings display screen, respectively.

C. Analysis Cloud Generated GUI

Figure 15:
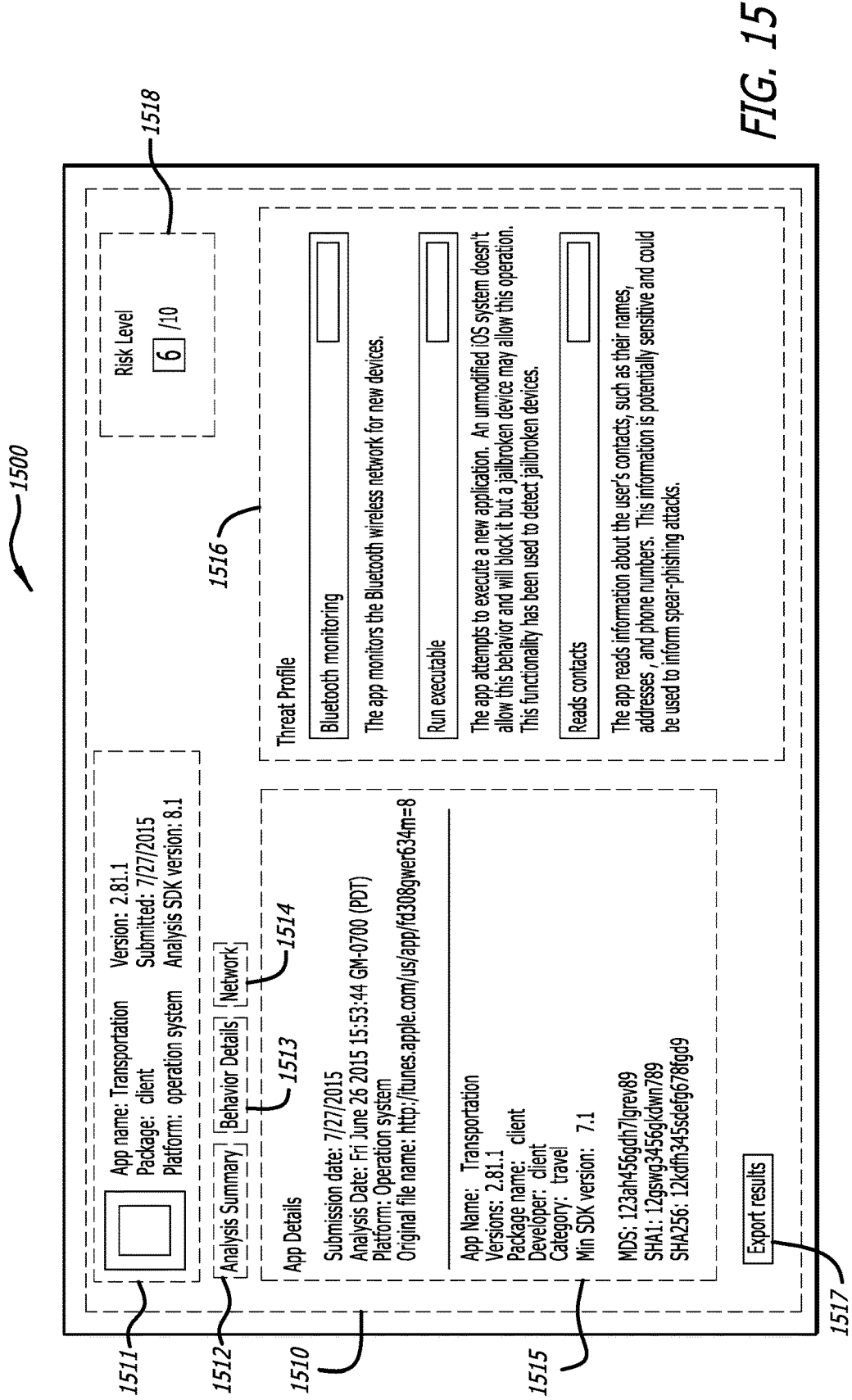
FIG. 15 is an exemplary embodiment of a mobile application risk analysis system 100 screen that illustrates details of a selected application installed on one or more mobile devices connected to the network 110.

Referring now to FIG. 15, and in combination with FIGS. 1A-1B and 2A-2B, an exemplary embodiment of a mobile application RAS 1500 screen that illustrates details of a selected application installed on one or more mobile devices connected to the network 110 is shown. Herein rendered by the analysis cloud 120, the display screen 1500 includes the display area 1510, which further comprises the display areas 1511, 1515, 1516, 1518 and 1519 and tabs 1512-1514. The display area 1511 presents an icon associated with the application and application information such as, but not limited or restricted to, the application name, the name of the software package of the application, the platform (e.g., operating system) for which the application is designed, etc.

The tabs 1512-1514 are selectable such that a selection of a tab allows a user (e.g., a network administrator) to view more information. For example, the tabs 1512-1514 may enable the user to see information related to an analysis summary of the application, behaviors of the application and settings of the network, respectively. The display area 1515 includes detailed information of the application such as, but not limited or restricted to, the submission date of the application, the date of the last analysis of the application, the developer, the category of the application, etc.

The display area 1516 provides information regarding one or more behaviors of the application, wherein the behaviors of the application may comprise the "threat profile" of the application. For example, the threat profile of the application of FIG. 15 includes, at least, (i) "Bluetooth monitoring," (ii) "Run executable," and (iii) "Reads contacts."

The tab 1517 titled, "Export results," enables a network administrator to export the results of the analysis of the application to, for example, a spreadsheet, a printer, a portable document format (PDF), an email, etc. The display area 1518 includes an illustration of the risk level of the application based upon a numerical score (e.g., 6/10) instead of merely a descriptive category (e.g., high, medium or low). This numerical score may provide more granularity for a network administrator.

Figure 16:
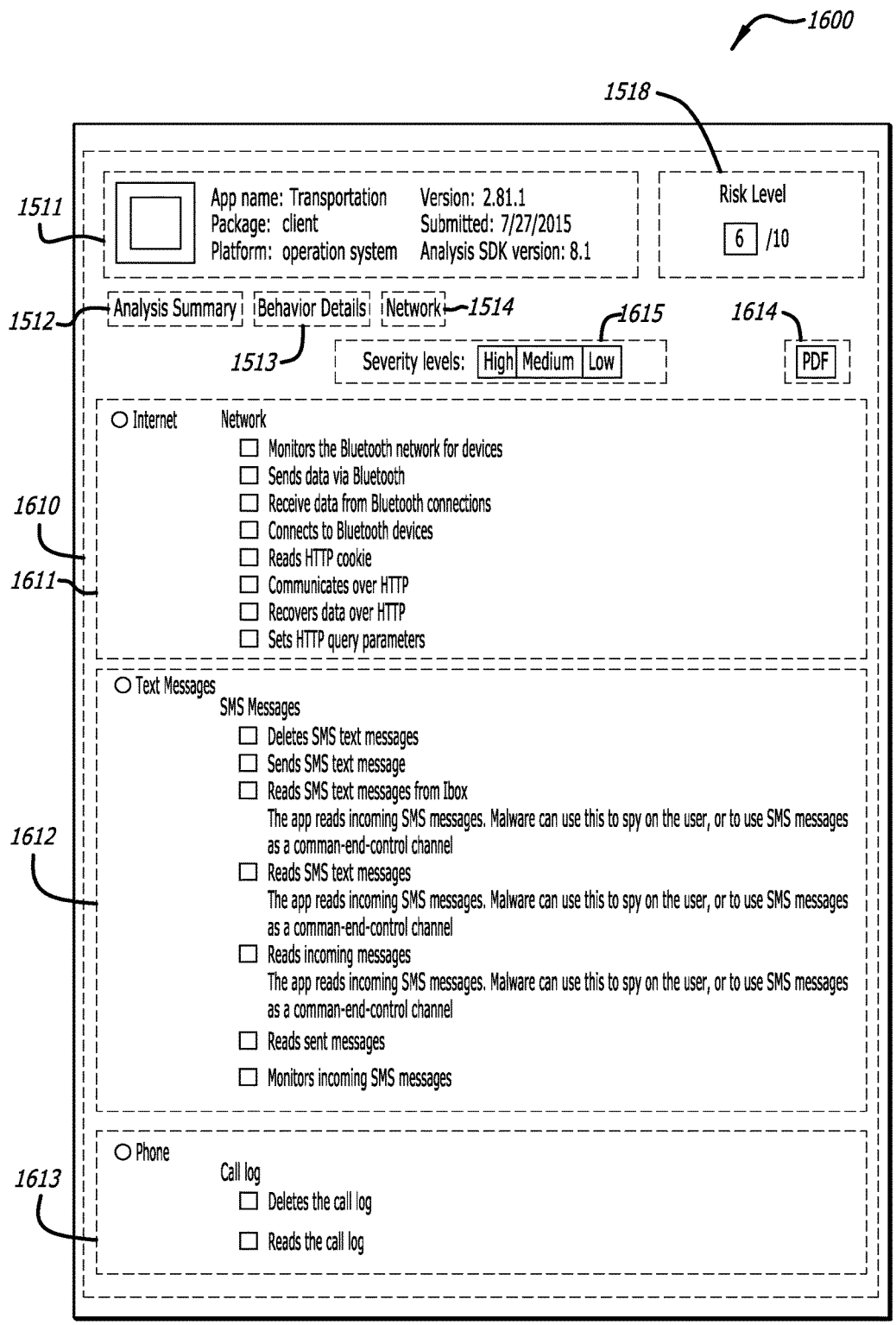
FIG. 16 is an exemplary embodiment of a mobile application risk analysis system 1600 screen that illustrates details of behaviors of a selected application installed on one or more mobile devices connected to the network 110.

Referring to FIG. 16, and in combination with FIGS. 1A-1B and 2A-2B, an exemplary embodiment of a mobile application RAS 100 screen that illustrates details of behaviors of a selected application installed on one or more mobile devices connected to the network 110 is shown. Herein rendered by the analysis cloud 120, the display screen 1600 includes the display area 1610, which further comprises the display areas 1511, 1518, 1611-1614, and tabs 1512-1514 and 1614. The display area 1511 presents an icon associated with the application and application information such as, but not limited or restricted to, the application name, the name of the software package of the application, the platform (e.g., operating system) for which the application is designed, etc. As discussed above, the tabs 1512-1514 are selectable such that a selection of a tab allows a user (e.g., a network administrator) to view more information.

The display areas 1611-1613 display behaviors of the selected application broken down into categories wherein the display area 1611 provides information on behaviors associated with the Internet, the display area 1612 provides information on behaviors associated with text messages and the display area 1613 provides information on behaviors associated with a phone. The display area 1615 provides a visual indication as to the severity level(s) of the behaviors illustrated in the display areas 1611-1613. The tab 1614 titled "PDF" enables a network administrator to export the information displayed on display screen 1600 to a PDF.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. An electronic device comprising: one or more processors;
  a non-transitory computer-readable storage medium communicatively coupled to the one or more processors, the non-transitory computer-readable storage medium having stored thereon logic that, upon execution by the one or more processors, performs operations comprising:
  receiving, via a first electrical signal, application data from an agent installed on a network device, wherein the application data includes usage information of one or more applications installed on the network device and configuration information of the network device.
  querying, via a second electrical signal, for a risk level of each of the one or more applications of the network device listed in the application data,
  responsive to a risk level of a first application of the one or more applications being unknown, (i) determining whether the first application includes a first embedded web browser, (ii) instructing virtual processing to be performed on an executable of the first application in a virtual machine that includes emulation of functionality of the first embedded web browser included in the first application, and (iii) determining the risk level of the first application based at least in part on the virtual processing, and
  determining a threat level for the network device based on one or more of: (i) the risk level of at least the first application, (ii) usage information of the at least the first application, or (iii) configuration information of the network device.

2. The electronic device of claim 1, wherein the virtual processing is performed on a first server associated with cloud computing.

3. The electronic device of claim 1, wherein the application data further includes one or more of: (a) a derivative representation for each of the one or more applications, (b) usage information of at least one of the one or more applications, or (c) configuration information of the network device.

4. The electronic device of claim 1, wherein the execution of the logic by the one or more processors performs operations further comprising:
  instructing a second server to (i) analyze network traffic of the network device by performing virtual processing of the first application in a virtual machine of the second server, the virtual processing including emulation of a second embedded web browser, and (ii) determine a risk level of the network traffic based on results of the virtual processing; and
  receiving the risk level of the network traffic from the second server.

5. The electronic device of claim 4, wherein the determination of the threat level for the network device is based on one or more of: (i) a risk level of at least one of the one or more applications, (ii) usage information of at least one of the one or more applications, (iii) configuration information of the network device, or (iv) the risk level of the network traffic.

6. The electronic device of claim 4, wherein the second embedded web browser is different from the first web browser.

7. The electronic device of claim 1, wherein the execution of the logic by the one or more processors performs operations further comprising:
  generating a first graphical user interface (GUI) that illustrates an overview of the risk level of at least the first application.

8. The electronic device of claim 7, wherein the execution of the logic by the one or more processors performs operations further comprising:
  generating a second GUI that illustrates an overview of one or more behaviors of one or applications, wherein the one or more behaviors contribute in determining the risk level of at least one of the one or more applications.

9. The electronic device of claim 1, wherein a database including risk levels for each of the one or more applications of the network device listed in the application data, wherein the database is stored on a first server associated with cloud computing.

10. The electronic device of claim 1, wherein the network device is an electronic device having capabilities of: (i) connecting to a network, (ii) downloading at least the first application, and (iii) installing at least the first application.

11. The electronic device of claim 10, wherein the electronic device is housed within a vehicular device that is configured to provide mobile capabilities.

12. The electronic device of claim 1, wherein an unknown risk level indicates a risk level is unspecified in a database.

13. The electronic device of claim 1, wherein the threat level is based on the risk level of the first application.

14. The electronic device of claim 1, wherein the first electrical signal is either a text message or an electrical mail (email) message.

15. A non-transitory computer readable storage medium having stored thereon logic that, upon execution by one or more processors implemented within a server, performs operations comprising:

receiving application data from an agent installed on a network device, wherein the application data includes usage information of a first application and configuration information of the network device;

querying for a risk level of the first application;

responsive to a risk level of the first application being unknown, (i) determining whether the first application includes a first embedded web browser, (ii) instructing virtual processing to be performed on an executable of the first application in a virtual machine that includes emulation of functionality of the first embedded web browser included in the first application, and (iii) determining the risk level of the first application based on least in part on the virtual processing;

and determining a threat level for the network device based on one or more of:

(i) the risk level of at least the first application, (ii) usage information of at least the first application, or (iii) configuration information of the network device.

16. The storage medium of claim 15, wherein the virtual processing is performed on a second server associated with cloud computing.

17. The storage medium of claim 15, wherein the first application data further includes, one or more of: (a) a derivative representation for each of the one or more applications, (b) usage information of at least one of the one or more applications, or (c) configuration information of the network device.

18. The storage medium of claim 15, wherein the logic, when executed by the one or more processors, performs operations further comprising:

instructing a third server to (i) analyze network traffic of the network device by performing virtual processing in a virtual machine of the third server of the first application, the virtual processing including emulation of an embedded web browser, and (ii) determine a risk level of the network traffic based on results of the virtual processing; and receiving the risk level of the network traffic from the third server.

19. The storage medium of claim 18, wherein the determination of the threat level for the network device is based on one or more of: (i) a risk level of at least one of the one or more applications, (ii) usage information of at least one of the one or more applications, (iii) configuration information of the network device, or (iv) the risk level of the network traffic.

20. The storage medium of claim 18, wherein the second embedded web browser is different from the first web browser.

21. The storage medium of claim 15, wherein the logic, when executed by the one or more processors, performs operations further comprising:

generating a first graphical user interface (GUI) that illustrates an overview of the risk level of at least the first application.

22. The storage medium of claim 21, wherein the logic, when executed by the one or more processors, performs operations further comprising:

generating a second GUI that illustrates an overview of one or more behaviors of one or more applications, wherein the one or more behaviors contribute in determining the risk level of at least one of the one or more applications.

23. The storage medium of claim 15, wherein the network device is an electronic device having a capability of connecting to a network, downloading and installing the one or more mobile applications.

24. The storage medium of claim 23, wherein the electronic device is housed within a vehicular device that is configured to provide mobile capabilities.

25. The storage medium of claim 15, wherein an unknown risk level indicates a risk level is unspecified in a database.

26. The storage medium of claim 15, wherein the threat level is based on the risk level of the first application.

27. A system for determining a threat level of a network device having a software agent installed thereon configured to track and record usage data of one or more applications installed on the network device, the system comprising:

a first server communicatively coupled to the software agent, the first server to (i) receive application data from the agent, (ii) query for a risk level of at least the first application, and (iii) determine a threat level for the network device based on one or more of: (a) a risk level of at least the first application, (b) usage information of at least the first application, or (c) configuration information of the network device;

a second server communicatively coupled to the first server and associated with cloud computing, the second server to receive an instruction from the first server to, responsive to the first server determining the risk level of the first application is unknown, (i) determine whether the first application includes a first embedded web browser, (ii) perform virtual processing of the first application in a virtual machine of the second server to determine the risk level of the first application, wherein the virtual processing includes emulation of functionality of the first embedded web browser included with the first application, and (iii) transmit the risk level of the first application to the first server; and a third server communicatively coupled to the first server, the third server to receive an instruction from the first server to analyze network traffic of the network device by performing a virtual processing in a virtual machine of the third server of the one or more applications, the virtual processing including emulation of a second embedded web browser, (ii) determine a risk level of the network traffic based on results of the virtual processing, and (iii) transmit the risk level of the network traffic to the first server.

28. The system of claim 27, wherein the virtual processing performed by the third server includes (i) launching at least the first application in the virtual machine of the third server, (ii) launching an emulator of the second embedded web browser in the virtual machine of the third server, and (iii) analyzing the network traffic passing through the emulator of the second embedded web browser for malicious or anomalous activity.

29. The system of claim 27, wherein the second server also performs a static analysis on the first application and determines the risk level of the first application based on results of the static analysis and results of the virtual processing.

30. The system of claim 27, wherein the determination of the threat level for the network device is based on one or more of: (i) a risk level of at least one of the one or more applications, (ii) usage information of at least the first application, (iii) configuration information of the network device, or (iv) the risk level of the network traffic.

31. The system of claim 27, wherein the first generates a first graphical user interface (GUI) that illustrates an overview of the risk level of at least the first application.

32. The system of claim 27, wherein the network device is an electronic device having a capability of connecting to a network, downloading and installing the one or more mobile applications.

33. The system of claim 27, wherein the electronic device is housed within a vehicular device that is configured to provide mobile capabilities.

34. The system of claim 27, wherein the first server is a cloud-based server and the second server is deployed within a network.

35. The system of claim 27, wherein an unknown risk level indicates a risk level is unspecified in a database.

36. The system of claim 27, wherein the threat level is based on the risk level of the first application.

37. The system of claim 27, wherein the second embedded web browser is different from the first web browser.

38. A computerized method comprising:
receiving, via a first electrical signal, application data from an agent installed on a network device, wherein the application data includes usage information of one or more applications installed on the network device and configuration information of the network device,
querying, via a second electrical signal, for a risk level of each of the one or more applications of the network device listed in the application data,
responsive to a risk level of a first application of the one or more applications being unknown, (i) determining whether the first application includes a first embedded web browser, (ii) instructing virtual processing to be performed on an executable of the first application in a virtual machine that includes emulation of functionality of the first embedded web browser included in the first application, and (iii) determining the risk level of the first application based at least in part on the virtual processing, and
determining a threat level for the network device based on one or more of: (i) the risk level of at least the first application, (ii) usage information of the at least the first application, or (iii) configuration information of the network device.

39. The computerized method of claim 38, wherein the virtual processing is performed on a first server associated with cloud computing.

40. The computerized method of claim 38, wherein the application data further includes one or more of: (a) a derivative representation for each of the one or more applications, (b) usage information of at least one of the one or more applications, or (c) configuration information of the network device.

41. The computerized method of claim 38, wherein the execution of the logic by the one or more processors performs operations further comprising:
instructing a second server to (i) analyze network traffic of the network device by performing virtual processing of the first application in a virtual machine of the second server, the virtual processing including emulation of a second embedded web browser, and (ii) determine a risk level of the network traffic based on results of the virtual processing; and receiving the risk level of the network traffic from the second server.

42. The computerized method of claim 41, wherein the determination of the threat level for the network device is based on one or more of: (i) a risk level of at least one of the one or more applications, (ii) usage information of at least one of the one or more applications, (iii) configuration information of the network device, or (iv) the risk level of the network traffic.

43. The computerized method of claim 41, wherein the second embedded web browser is different from the first embedded web browser.

44. The computerized method of claim 38, wherein the execution of the logic by the one or more processors performs operations further comprising:
generating a first graphical user interface (GUI) that illustrates an overview of the risk level of at least the first application.

45. The computerized method of claim 44, wherein the execution of the logic by the one or more processors performs operations further comprising:
generating a second GUI that illustrates an overview of one or more behaviors of one or applications, wherein the one or more behaviors contribute in determining the risk level of at least one of the one or more applications.

46. The computerized method of claim 38, wherein a database including risk levels for each of the one or more applications of the network device listed in the application data, wherein the database is stored on a first server associated with cloud computing.

47. The computerized method of claim 38, wherein the network device is an electronic device having capabilities of: (i) connecting to a network, (ii) downloading at least the first application, and (iii) installing at least the first application.

48. The computerized method of claim 47, wherein the electronic device is housed within a vehicular device that is configured to provide mobile capabilities.

49. The computerized method of claim 38, wherein an unknown risk level indicates a risk level is unspecified in a database.

50. The computerized method of claim 38, wherein the threat level is based on the risk level of the first application.

51. The computerized method of claim 38, wherein the first electrical signal is either a text message or an electrical mail (email) message.

* * * * *

UNITED STATES PATENT AND TRADEMARK OFFICE
CERTIFICATE OF CORRECTION

PATENT NO.         : 10,715,542 B1
APPLICATION NO.    : 15/199900
DATED              : July 14, 2020
INVENTOR(S)        : Wen Wei and Yulong Zhang It is certified that error appears in the above-identified patent and that said Letters Patent is hereby corrected as shown below:

In the Claims

At Column 29, Line number 3, Claim 31, between "first" and "generates", insert --server--.

Signed and Sealed this
Eighteenth Day of August, 2020

Andrei Iancu
*Director of the United States Patent and Trademark Office*